US012800550B2

(12) United States Patent
Tanigawa

(10) Patent No.: US 12,800,550 B2
(45) Date of Patent: Nov. 17, 2026

(54) ANOMALY DETECTION DEVICE, ANOMALY DETECTION METHOD, AND RECORDING MEDIUM

(71) Applicant: Panasonic Intellectual Property Corporation of America, Torrance, CA (US)

(72) Inventor: Risako Tanigawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 276 days.

(21) Appl. No.: 18/625,616

(22) Filed: Apr. 3, 2024

(65) Prior Publication Data

US 2024/0248066 A1 Jul. 25, 2024

Related U.S. Application Data

(63) Continuation of application No. PCT/JP2022/035136, filed on Sep. 21, 2022.

(30) Foreign Application Priority Data

Oct. 21, 2021 (JP) ................................ 2021-172687

(51) Int. Cl.
*G01N 29/24* (2006.01)
*G01N 29/04* (2006.01)
(Continued)

(52) U.S. Cl.
CPC ......... *G01N 29/2418* (2013.01); *G01N 29/04* (2013.01); *G08B 21/187* (2013.01);
(Continued)

(58) Field of Classification Search
CPC ............... G01N 29/2418; G01N 29/04; G01N 2291/023; G01N 2291/0289;
(Continued)

(56) References Cited

U.S. PATENT DOCUMENTS

| | | | |
|---|---|---|---|
| 2014/0260527 A1 | 9/2014 | Mazzeo et al. | |
| 2016/0011088 A1 | 1/2016 | Guthrie et al. | |
| 2019/0210159 A1 | 7/2019 | Endoh et al. | |
| 2019/0321905 A1 | 10/2019 | Wang et al. | |

FOREIGN PATENT DOCUMENTS

| | | | |
|---|---|---|---|
| DE | 102017205586 A1 * | 10/2018 | ............... G01H 9/00 |
| EP | 2008755 | 12/2008 | |

(Continued)

OTHER PUBLICATIONS

International Search Report (ISR) issued on Nov. 1, 2022 in International (PCT) Application No. PCT/JP2022/035136.

*Primary Examiner* — Laura Martin Sweeney
*Assistant Examiner* — Anthony W Megna Fuentes
(74) *Attorney, Agent, or Firm* — Wenderoth, Lind & Ponack, L.L.P.

(57) ABSTRACT

An anomaly detection device includes: a sound collector that acquires a sound which is generated at a welded part during laser welding and is collected by the sound collector; and a detector that detects an anomaly in the welded part based on a change in an inaudible sound included in the sound acquired by the sound collector.

12 Claims, 15 Drawing Sheets

(51) Int. Cl.

*G01N 29/11* (2006.01)
*G01N 29/14* (2006.01)
*G08B 21/18* (2006.01)
*H04R 23/00* (2006.01)

(52) U.S. Cl.

CPC ..... *H04R 23/008* (2013.01); *G01N 2291/023* (2013.01); *G01N 2291/0289* (2013.01); *G01N 2291/267* (2013.01)

(58) Field of Classification Search

CPC .. G01N 2291/267; G01N 29/11; G01N 29/14; G01N 29/24; G08B 21/187; H04R 23/008

See application file for complete search history.

(56) References Cited

FOREIGN PATENT DOCUMENTS

| | | | | | |
|---|---|---|---|---|---|
| JP | 5-66202 | | | 3/1993 | |
| JP | 6-39282 | | | 5/1994 | |
| JP | 2001-321972 | | | 11/2001 | |
| JP | 2007-253197 | | | 10/2007 | |
| JP | 2007-253220 | | | 10/2007 | |
| JP | 2009-115767 | | | 5/2009 | |
| JP | 2010-52009 | | | 3/2010 | |
| JP | 2010-266404 | | | 11/2010 | |
| JP | 2018-1184 | | | 1/2018 | |
| JP | 2019-188470 | | | 10/2019 | |
| JP | 2019188470 | A | * | 10/2019 | ............... B23K 9/32 |
| JP | 2020-189305 | | | 11/2020 | |

* cited by examiner

ANOMALY DETECTION DEVICE, ANOMALY DETECTION METHOD, AND RECORDING MEDIUM

CROSS REFERENCE TO RELATED APPLICATIONS

This is a continuation application of PCT International Application No. PCT/JP2022/035136 filed on Sep. 21, 2022, designating the United States of America, which is based on and claims priority of Japanese Patent Application No. 2021-172687 filed on Oct. 21, 2021. The entire disclosures of the above-identified applications, including the specifications, drawings and claims are incorporated herein by reference in their entirety.

FIELD

The present disclosure relates to anomaly detection devices and the like.

BACKGROUND

For example, Patent Literature (PTL) 1 discloses a technique which detects a normal welding state or a defective (hereinafter also referred to as anomalous) welding state of a welded part based on the signal level (that is, the sound pressure) of an audible sound included in a sound (hereinafter also referred to as a welding sound) generated at the welded part during laser welding.

CITATION LIST

Patent Literature

PTL 1: Japanese Unexamined Patent Application Publication No. 05-066202

SUMMARY

Technical Problem

However, in the technique disclosed in PTL 1, an anomaly in the welded part is detected based on the audible sound included in the welding sound, and thus the detection is easily affected by noise, with the result that there is an anomaly which cannot be detected.

Hence, the present disclosure provides an anomaly detection device and the like which can enhance the accuracy of detection of an anomaly in a welded part.

Solution to Problem

An anomaly detection device according to an aspect of the present disclosure includes: an acquirer that acquires a sound which is generated at a welded part during laser welding and is collected by a sound collector; and a detector that detects an anomaly in the welded part based on a change in an inaudible sound included in the sound acquired by the acquirer.

Advantageous Effects

According to the present disclosure, it is possible to provide an anomaly detection device and the like which can enhance the accuracy of detection of an anomaly in a welded part.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Outline of Present Disclosure

Figure 1:
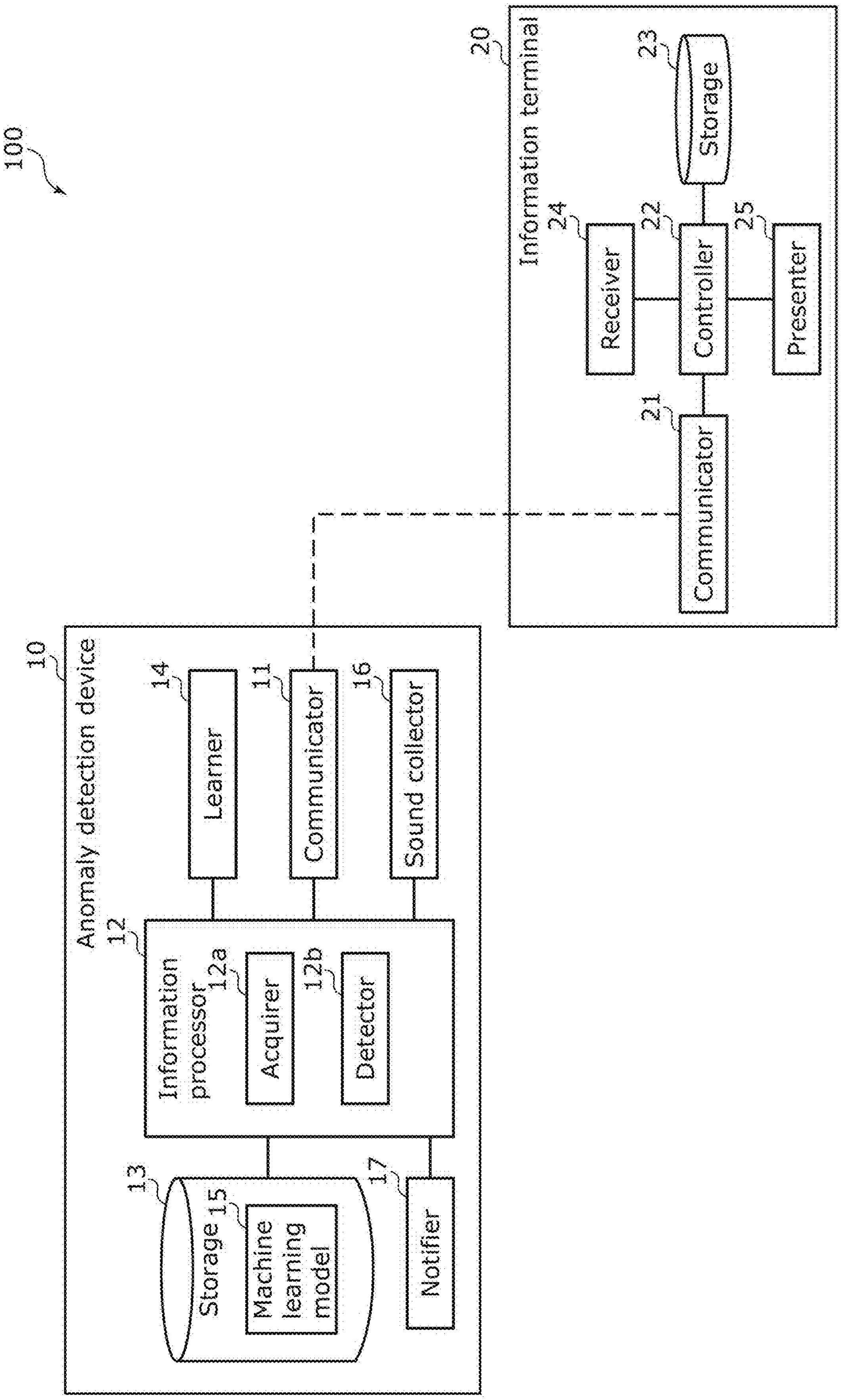
FIG. 1 is a block diagram showing an example of the functional configuration of an anomaly detection system in an embodiment.

An anomaly detection device according to an aspect of the present disclosure includes: an acquirer that acquires a sound which is generated at a welded part during laser welding and is collected by a sound collector; and a detector that detects an anomaly in the welded part based on a change in an inaudible sound included in the sound acquired by the acquirer.

In this way, the anomaly detection device detects an anomaly in the welded part based on the inaudible sound included in the sound generated at the welded part during laser welding, and thus the anomaly detection device is unlikely to be affected by various audible sounds generated around the sound collector, that is, sounds resulting in noise. Since the band of the inaudible sound is unlikely to be affected by sounds resulting in noise, when the inaudible sound is changed (for example, when the sound pressure of the inaudible sound is changed), the anomaly detection device can detect the change. Hence, the anomaly detection device can enhance the accuracy of detection of an anomaly in the welded part.

In the anomaly detection device according to the aspect of the present disclosure, the detector may detect the anomaly in the welded part based on a decrease in a sound pressure of the inaudible sound included in the sound.

In this way, the anomaly detection device detects an anomaly in the welded part based on a decrease in the sound pressure of the inaudible sound included in the sound generated at the welded part during laser welding, and thus the anomaly detection device is unlikely to be affected by various audible sounds generated around the sound collector, that is, sounds resulting in noise. Since the band of the inaudible sound is unlikely to be affected by sounds resulting in noise, when the sound pressure of the inaudible sound is decreased, the anomaly detection device can detect the decrease in the sound pressure. It is assumed that when an anomaly occurs in the welded part, the sound pressure of the inaudible sound included in the sound generated at the welded part tends to be decreased. Hence, the anomaly detection device can enhance the accuracy of detection of an anomaly in the welded part.

The anomaly detection device according to the aspect of the present disclosure may further include: a notifier that provides a notification to a user when the detector detects the anomaly.

In this way, the anomaly detection device can notify the occurrence of an anomaly in the welded part to the user, and thus the user can grasp whether an anomaly occurs in the welded part.

In the anomaly detection device according to the aspect of the present disclosure, the sound collector may be a laser microphone.

In this way, the anomaly detection device uses the laser microphone as the sound collector to be able to acquire a sound in a band broader than a case where a normal microphone is used, and thus a larger amount of information can be obtained. Hence, the anomaly detection device can detect an anomaly in the welded part based on a larger amount of information. Therefore, the anomaly detection device can extract a larger feature amount, and thus it is possible to enhance the accuracy of detection of an anomaly in the welded part. Although in the normal microphone (for example, a microphone including a diaphragm), it is difficult to collect a sound due to electromagnetic waves, a high temperature, the adhesion of metal pieces, or the like, the anomaly detection device uses the laser microphone to be able to collect a sound even in an environment where it is difficult to collect a sound with the normal microphone. Hence, the anomaly detection device can detect an anomaly in more environments.

In the anomaly detection device according to the aspect of the present disclosure, the inaudible sound may be a sound in a frequency band of 100 kHz or higher and 200 kHz or lower.

In this way, the anomaly detection device can extract, as the feature amount, a sound in a specific frequency band in the inaudible sound. Hence, the anomaly detection device can accurately detect an anomaly in the welded part based on the extracted feature amount.

In the anomaly detection device according to the aspect of the present disclosure, the detector may further detect the anomaly based on an increase in a sound pressure of an audible sound included in the sound.

In this way, the anomaly detection device can extract a larger feature amount based on the inaudible sound and the audible sound included in the sound. Hence, the anomaly detection device can enhance the accuracy of detection of an anomaly in the welded part.

In the anomaly detection device according to the aspect of the present disclosure, the detector may detect the anomaly based on a result of an output obtained by inputting sound information about the sound acquired by the acquirer to a trained machine learning model.

In this way, the anomaly detection device uses the machine learning model to be able to automatically extract the feature amount from the sound information, and thereby can more easily detect an anomaly in the welded part.

In the anomaly detection device according to the aspect of the present disclosure, the sound information may include at least one of image data of a spectrogram of the sound, image data of a frequency characteristic of the sound, or time series data of the sound.

In this way, the anomaly detection device uses the sound information from which the feature amount of data is easily extracted to be able to facilitate the extraction of regularity of data (so-called feature amount) performed by the machine learning model.

In the anomaly detection device according to the aspect of the present disclosure, the time series data may be a time waveform of the sound.

In this way, the anomaly detection device uses the time waveform of the sound as the time series data of the sound to be able to facilitate the extraction of the feature amount about an increase and a decrease in the sound volume (that is, the sound pressure) performed by the machine learning model.

In the anomaly detection device according to the aspect of the present disclosure, the result of the output may indicate whether the anomaly occurs in the welded part or indicate a degree of the anomaly.

In this way, the anomaly detection device can detect an anomaly in the welded part based on whether an anomaly occurs in the welded part or the degree of anomaly.

In the anomaly detection device according to the aspect of the present disclosure, the sound may be a sound that is generated at the welded part when laser light is applied to the welded part, and may include a sound that is generated when an impurity adheres to the welded part.

In this way, the anomaly detection device can detect an anomaly in the welded part based on the sound.

In the anomaly detection device according to the aspect of the present disclosure, the anomaly may be at least one of production of spatter or production of a crack in the welded part.

In this way, the anomaly detection device can detect not only an anomaly in the front surface of the welded part but also an anomaly which occurs inside a welding target or in the back surface.

An anomaly detection device according to an aspect of the present disclosure includes: a laser microphone that collects a sound which is generated at a welded part during laser welding; and a detector that detects an anomaly in the welded part based on the sound collected by the laser microphone.

In this way, the anomaly detection device can collect a sound using the laser microphone even in an environment where it is difficult to collect a sound with the normal microphone. For example, although in the normal microphone (for example, a microphone including a diaphragm), it is difficult to collect a sound due to electromagnetic waves, a high temperature, the adhesion of metal pieces, or the like, the laser microphone does not include a diaphragm, and thus it is possible to collect a sound even in an environment of electromagnetic waves, a high temperature, high heat, metal pieces, or the like.

An anomaly detection method according to an aspect of the present disclosure includes: acquiring a sound that is generated at a welded part during laser welding and is collected by a sound collector; and detecting an anomaly in the welded part based on a change in an inaudible sound included in the sound acquired in the acquiring.

In this way, a device which performs the anomaly detection method detects an anomaly in the welded part based on the inaudible sound included in the sound generated at the welded part during laser welding, and thus the device is unlikely to be affected by various audible sounds generated around the sound collector, that is, sounds resulting in noise. Since the band of the inaudible sound is unlikely to be affected by sounds resulting in noise, when the inaudible sound is changed (for example, when the sound pressure of the inaudible sound is changed), the device which performs the anomaly detection method can detect the change. Hence, the device which performs the anomaly detection method can enhance the accuracy of detection of an anomaly in the welded part.

In the anomaly detection method according to the aspect of the present disclosure, in the detecting, the anomaly in the welded part may be detected based on a decrease in a sound pressure of the inaudible sound included in the sound.

In this way, the device which performs the anomaly detection method detects an anomaly in welded part 3*c* based on a decrease in the sound pressure of the inaudible sound included in sound 4 generated at welded part 3*c* during laser welding, and thus the device is unlikely to be affected by various audible sounds generated around sound collector 16, that is, sounds resulting in noise. Since the band of the inaudible sound is unlikely to be affected by sounds resulting in noise, when the sound pressure of the inaudible sound is decreased, the device which performs the anomaly detection method can detect the decrease in the sound pressure. It is assumed that when an anomaly occurs in the welded part, the sound pressure of the inaudible sound included in the sound generated at the welded part tends to be decreased. Hence, the device which performs the anomaly detection method can enhance the accuracy of detection of an anomaly in welded part 3*c*.

An anomaly detection method according to an aspect of the present disclosure includes: collecting, by a laser microphone, a sound that is generated at a welded part during laser welding; and detecting an anomaly in the welded part based on the sound collected by the laser microphone.

In this way, the anomaly detection method can collect a sound using the laser microphone even in an environment where it is difficult to collect a sound with the normal microphone. For example, although in the normal microphone (for example, a microphone including a diaphragm), it is difficult to collect a sound due to electromagnetic waves, a high temperature, the adhesion of metal pieces, or the like, the laser microphone does not include a diaphragm, and thus it is possible to collect a sound even in an environment of electromagnetic waves, a high temperature, high heat, metal pieces, or the like.

A program according to an aspect of the present disclosure is a program for causing a computer to execute any one of the anomaly detection methods described above.

In this way, it is possible to use a computer to achieve the same effect as in any one of the anomaly detection methods described above.

These general and specific aspects may be implemented using a system, a method, a device, an integrated circuit, a computer program, or a computer-readable recording medium such as a compact disc read only memory (CD-ROM), or any combination of systems, methods, devices, integrated circuits, computer programs, or recording media.

An embodiment of the present disclosure will be specifically described below with reference to drawings. Numerical values, shapes, materials, constituent elements, the arrangement and connection of the constituent elements, steps, the order of the steps, and the like shown in the following embodiment are examples, and are not intended to limit the scope of claims. Among the constituent elements in the following embodiment, constituent elements which are not recited in the independent claims showing the highest level of concept are described as optional constituent elements. The drawings are not exactly shown. In the drawings, substantially the same configurations are identified with the same reference signs, and repeated descriptions may be omitted or simplified.

In the present disclosure, terms such as parallel and vertical which indicate relationships between elements, terms such as rectangular which indicate the shapes of elements, and numerical values are expressions which not only indicate exact meanings but also indicate substantially equivalent ranges such as a range including a several percent difference.

Embodiment

The embodiment will be specifically described below with reference to drawings.

[1. Configuration]

FIG. 1 is a block diagram showing an example of the functional configuration of anomaly detection system 100 in the embodiment. Anomaly detection system 100 is, for example, a system which acquires a sound that is generated at a welded part during laser welding and is collected, and detects an anomaly in the welded part from the acquired sound. For example, anomaly detection system 100 detects an anomaly in the welded part based on a change in an inaudible sound included in the acquired sound. More specifically, anomaly detection system 100 may detect an anomaly in the welded part based on a decrease in the sound pressure of the inaudible sound or may detect an anomaly in the welded part based on an increase in the sound pressure of an audible sound included in the acquired sound in addition to a decrease in the sound pressure of the inaudible sound. When an anomaly is detected, anomaly detection system 100 may notify the information of the detection to a user.

The inaudible sound is a sound in a frequency band which cannot be detected by the human ear (in other words, which cannot be heard by the human ear), is specifically a sound in a frequency band of 20 kHz or higher (so-called ultrasonic band), and is particularly a sound in a frequency band of 100 kHz or higher and 200 kHz or lower.

The audible sound is a sound in a frequency band which can be detected by the human ear (in other words, which can be heard by the human ear), and is specifically a sound in a frequency band of 20 Hz or higher and less than 20 kHz.

Anomaly detection system 100 includes, for example, anomaly detection device 10 and information terminal 20.

The configurations of anomaly detection device 10 and information terminal 20 will be described below.

[Anomaly Detection Device 10]

Anomaly detection device 10 according to the embodiment detects an anomaly in a welded part based on a change in an inaudible sound included in a sound generated at the part welded by laser welding. For example, anomaly detection device 10 detects an anomaly in the welded part based on a decrease in the sound pressure of the inaudible sound included in the sound generated at the welded part during laser welding. Anomaly detection device 10 may further detect an anomaly in the welded part based on an increase in the sound pressure of an audible sound included in the sound generated at the welded part. In other words, anomaly detection device 10 may detect an anomaly in the welded part based on a decrease in the sound pressure of the inaudible sound and an increase in the sound pressure of the audible sound included in the sound generated at the welded part during laser welding. In this way, sounds in a broad band ranging from the audible sound to the inaudible sound are sensed, and thus the accuracy of detection of an anomaly in the welded part is enhanced.

Anomaly detection device 10 includes, for example, communicator 11, information processor 12, storage 13, learner 14, sound collector 16, and notifier 17. The configurations of communicator 11, information processor 12, storage 13, learner 14, sound collector 16, and notifier 17 will be described below.

[Communicator 11]

Communicator 11 is a communication circuit (or a communication module) with which anomaly detection device 10 communicates with information terminal 20. Although communicator 11 includes a communication circuit (or a communication module) for performing communication via a local communication network, communicator 11 may include a communication circuit (or a communication module) for performing communication via a wide area communication network. Although communicator 11 is, for example, a wireless communication circuit which performs wireless communication, communicator 11 may be a wired communication circuit which performs wired communication. Communication standards for communication performed by communicator 11 are not particularly limited.

[Information Processor 12]

Information processor 12 acquires a sound collected by sound collector 16 and performs various types of information processing on the detection of an anomaly in the welded part based on sound information about the acquired sound. Specifically, information processor 12 includes acquirer 12*a* and detector 12*b*. The processor or microcomputer of information processor 12 executes computer programs stored in storage 13, and thus the functions of acquirer 12*a* and detector 12*b* are realized.

[Acquirer 12*a*]

Acquirer 12*a* acquires the sound (hereinafter also referred to as a welding sound) which is collected by sound collector 16. The welding sound is a sound which is generated at the welded part during laser welding.

[Detector 12*b*]

Detector 12*b* detects an anomaly in the welded part based on a change in an inaudible sound included in the sound acquired by acquirer 12*a*. For example, detector 12*b* may detect an anomaly in the welded part based on a decrease in the sound pressure of the inaudible sound included in the sound collected by sound collector 16 or may detect an anomaly in the welded part based on a decrease in the sound pressure of the inaudible sound and an increase in the sound pressure of an audible sound included in the collected sound. Here, detector 12*b* may detect an anomaly in the welded part based on the result of an output obtained by inputting sound information about the sound collected by sound collector 16 to trained machine learning model 15. The sound information may include, for example, at least one of image data of a spectrogram of the sound, image data of a frequency characteristic of the sound, or time series data of the sound. The time series data of the sound may be time series numerical data of the sound or may be the time waveform of the sound. The details of the operation (so-called detection processing) of detector 12*b* will be described later in [2. Operation].

[Storage 13]

Storage 13 is a storage device in which dedicated application programs to be executed by information processor 12 and the like are stored. Although storage 13 is realized, for example, by a hard disk drive (HDD), storage 13 may be realized by a semiconductor memory. In storage 13, trained machine learning model 15 may be stored. In this case, machine learning model 15 may be used for detection processing of an anomaly in the welded part.

[Machine Learning Model 15]

Although machine learning model 15 may be, for example, a convolutional neural network (CNN), machine learning model 15 is not limited to the convolutional neural network. For example, machine learning model 15 may be a fully-integrated neural network. When the sound information is time series numerical data (for example, time series numerical data of a spectrogram or a frequency characteristic of the sound), machine learning model 15 may be a recurrent neural network (RNN) model. In other words, machine learning model 15 may be selected as necessary depending on the format of input data. Machine learning model 15 is obtained by learning performed by learner 14. Machine learning model 15 may be constructed, for example, by learning a relationship between the sound (so-called welding sound) generated at the welded part during laser welding and whether an anomaly occurs in the welded part. The welding sound includes the inaudible sound which cannot be detected by the human ear and the audible sound which can be detected by the human ear.

[Learner 14]

Learner 14 performs learning of the machine learning model. For example, learner 14 may perform supervised learning. In this case, learner 14 may perform learning of the machine learning model using teacher data or may perform learning of the machine learning model without using teacher data. For example, when learner 14 performs learning of the machine learning model using teacher data, the teacher data may include: first data of the sound information about the sound generated at the welded part during laser welding and an annotation indicating an anomaly in the welded part; and second data of the sound information and an annotation indicating no anomaly (that is, normality) in the welded part. When learner 14 performs learning of the machine learning model without using teacher data, data which is used for learning is the sound information about the sound generated at the welded part during laser welding.

[Sound Collector 16]

Figure 2:
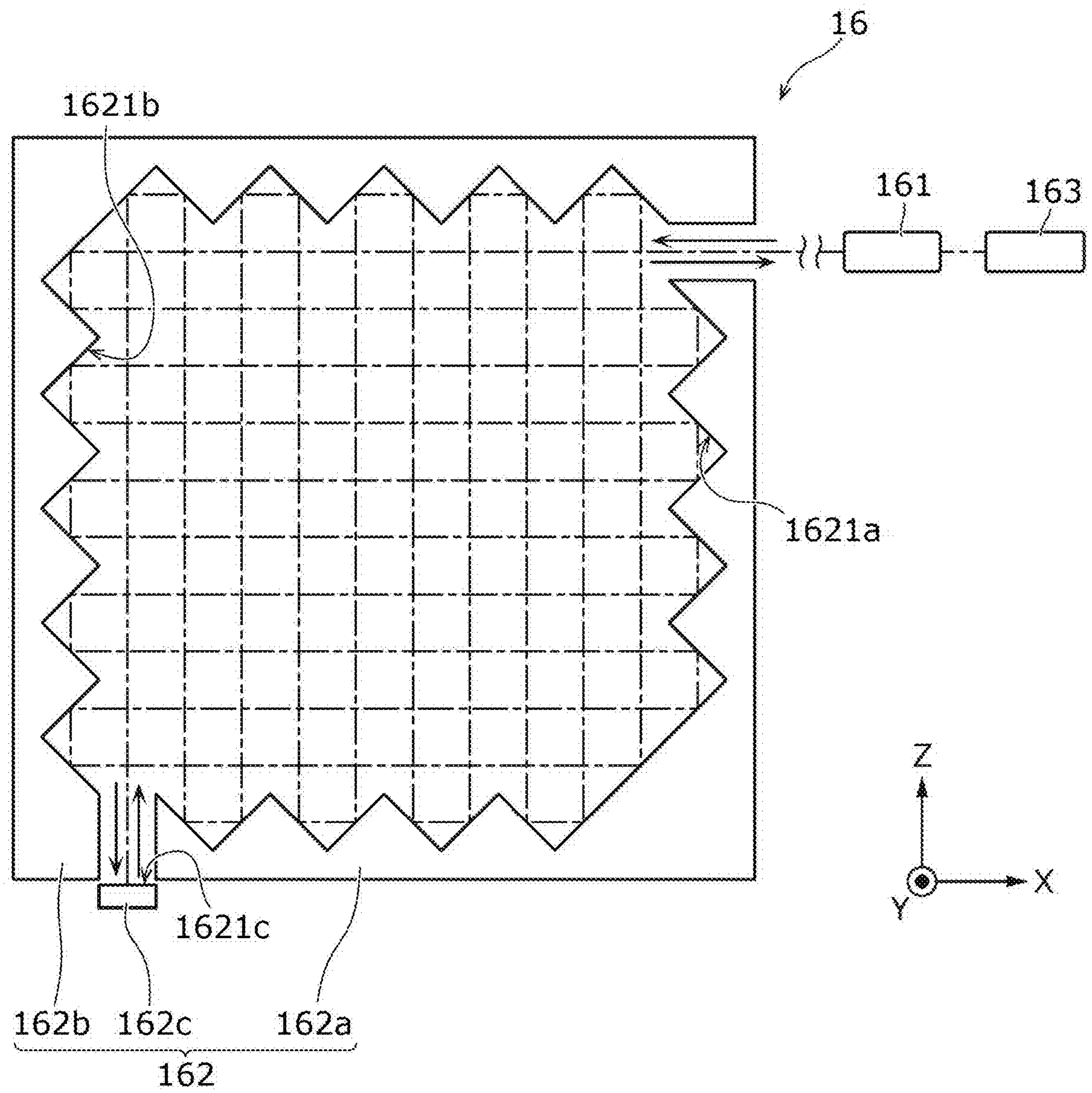
FIG. 2 is a diagram showing an example of the configuration of a sound collector.
Figure 3:
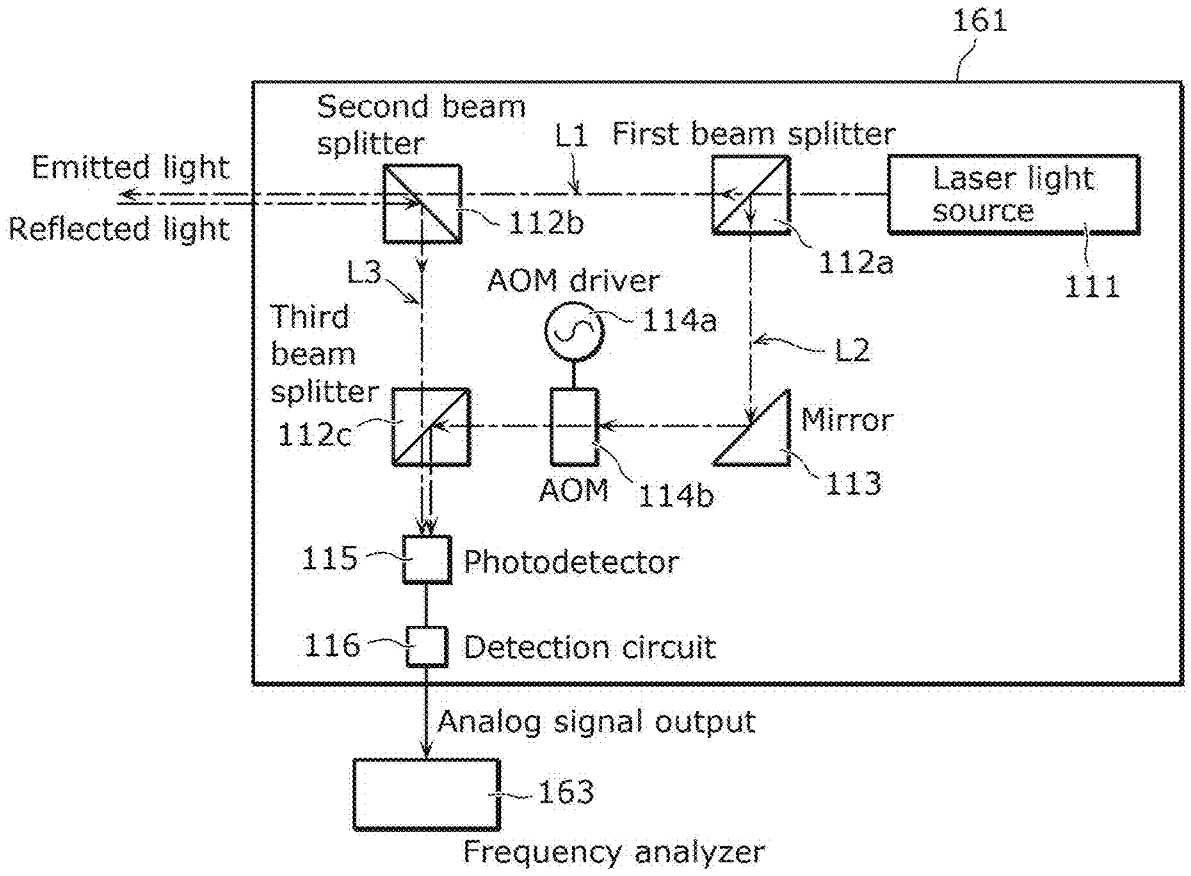
FIG. 3 is a diagram for illustrating an example of the configuration of a measurer shown in FIG. 2.

Sound collector 16 collects the sound generated at the welded part during laser welding. Sound collector 16 is, for example, a microphone, and is specifically a laser microphone. Although FIG. 1 shows an example where anomaly detection device 10 includes one sound collector 16, anomaly detection device 10 may include two or more sound collectors 16. When anomaly detection device 10 includes two or more sound collectors 16, each of sound collectors 16 may collect a sound which is generated at a different welded part. Sound collector 16 converts the collected sound to an electrical signal, and outputs the electrical signal to information processor 12. Here, the configuration of sound collector 16 will be described with reference to FIGS. 2 and 3. FIG. 2 is a diagram showing an example of the configuration of sound collector 16. Sound collector 16 shown in FIG. 2 is a laser microphone. FIG. 3 is a diagram for illustrating an example of the configuration of measurer 161 shown in FIG. 2.

As shown in FIG. 2, sound collector 16 includes, for example, measurer 161, frame 162, and calculator 163. The configurations of measurer 161, frame 162, and calculator 163 will be described below.

Frame 162 includes at least one reflective member which surrounds a predetermined space through which a sound passes so as to intersect the direction of travel of the sound. Sound collector 16 measures the sound traveling from the positive direction of a Y-axis toward a ZX plane in the predetermined space. The surrounding of the predetermined space so as to intersect the direction of travel of the sound includes surrounding a part of the predetermined space with at least one reflective member without fully surrounding the predetermined space. When a pair of reflective members are arranged in parallel, the surrounding of the predetermined space so as to intersect the direction of travel of the sound includes surrounding the predetermined space with the pair of reflective members.

Frame 162 includes, for example, two reflective members 162*a* and 162*b*, and two reflective members 162*a* and 162*b* are arranged apart from each other. In this case, frame 162 may have at least one gap between two reflective members 162*a* and 162*b*. The at least one gap is, for example, a gap (hereinafter also referred to as an entrance) for allowing laser light to enter the predetermined space or a gap (hereinafter also referred to as an angle adjustment port) for adjusting the reflection angle of laser light to return the laser light to the entrance. Frame 162 may include angle adjustment reflective member 162*c* in or outside (on the negative side of a Z-axis) the angle adjustment port. Angle adjustment reflective member 162*c* includes reflective surface 1621*c*, and is arranged to direct reflective surface 1621*c* to the predetermined space. Angle adjustment reflective member 162*c* may be attached to a support shaft (not shown) fixed to two reflective members 162*a* and 162*b* such that angle adjustment reflective member 162*c* can be turned or may be supported such that angle adjustment reflective member 162*c* is tiltably supported by a piezoelectric member. In this way, angle adjustment reflective member 162*c* can adjust the reflection angle of the laser light relative to reflective surface 1621*c*, and thus it is possible to accurately return the laser light to measurer 161.

The shape of frame 162 may be triangular, square, pentagonal, hexagonal, circular, or elliptical when viewed in the direction of travel of the sound. Here, the shape of frame 162 is square.

The size of frame 162 may be set as necessary according to the design of frame 162. For example, the width (length in the direction of an X-axis) and the height (length in the direction of the Z-axis) of frame 162 each may be 130 mm, and the depth (length in the direction of the Y-axis) may be 20 mm.

Each of two reflective members 162*a* and 162*b* includes at least one reflective surface. For example, two reflective members 162*a* and 162*b* include a plurality of reflective surfaces 1621*a* and a plurality of reflective surfaces 1621*b*, respectively, and reflective surfaces 1621*a* and reflective surfaces 1621*b* are arranged to be directed to the predetermined space. More specifically, when the predetermined space is viewed in the direction of travel of the sound (that is, the direction of the Y-axis), reflective surfaces 1621*a* and reflective surfaces 1621*b* are arranged to intersect and multiply reflect the laser light in the predetermined space. For example, each of reflective surfaces 1621*a* is a flat surface, and reflective surfaces 1621*a* are continuously formed. Furthermore, the directions of reflective surfaces 1621*a* are different in the predetermined space. Reflective surfaces 1621*a* may be different in shape and area. For example, the shapes of reflective surfaces 1621*a* may be square, rectangular, or trapezoidal, and the areas of reflective surfaces 1621*a* may be different depending on the positions (for example, corners, ends and the like) of reflective surfaces 1621*a* arranged in reflective member 162*a*. Although reflective surfaces 1621*a* are continuously formed, they do not need to be continuously formed. When reflective surfaces 1621*a* are not continuously formed, reflective member 162*a* may be produced by sticking a reflective plate on a plurality of surfaces serving as reflective surfaces 1621*a*. The same is true for reflective surfaces 1621*b* as for reflective surfaces 1621*a*.

Measurer 161 emits the laser light to the predetermined space, and measures a sound pressure in the predetermined space based on the phase variation of the laser light (hereinafter also referred to as reflected light) which is reflected in the predetermined space surrounded by reflective members 162*a* and 162*b* and is returned to measurer 161. Measurer 161 is, for example, a laser Doppler vibrometer or a photodiode. When measurer 161 is the laser Doppler vibrometer, measurer 161 has, for example, a configuration shown in FIG. 3.

As shown in FIG. 3, measurer 161 includes laser light source 111 which emits the laser light, and the laser light output from laser light source 111 is split into two directions by first beam splitter 112*a*. Laser light L1 (so-called emitted light) split in one of the two directions is emitted through second beam splitter 112*b*. On the other hand, the optical axis of laser light L2 in the other direction obtained by the splitting performed by first beam splitter 112*a* is adjusted by mirror 113, thus laser light L2 enters AOM 114*b* which is driven by acousto-optic modulator (AOM) driver 114*a*, and reference light obtained by shifting the frequency of the laser light is output from AOM 114*b*. The reference light is passed through third beam splitter 112*c* to be optically adjusted such that the reference light is applied to light receiver 115 (for example, a photodetector). Laser light L3 (so-called reflected light) which is reflected in the predetermined space to be returned is applied to light receiver 115 via second beam splitter 112*b* and third beam splitter 112*c*, and is superimposed on the reference light into interference light, and the interference light is received by light receiver 115. Measurer 161 uses detection circuit 116 to detect the phase variation of the laser light caused by the superimposed interference described above, and outputs the phase variation as an analog signal to calculator 163.

Calculator 163 calculates a sound pressure in the predetermined space based on the signal output from measurer 161. For example, calculator 163 may be a frequency analyzer.

As an example where measurer 161 includes laser light source 111 and light receiver 115 in one housing, the example where measurer 161 is the laser Doppler vibrometer is described. However, the configuration of measurer 161 is not limited to this example. Measurer 161 may include each of laser light source 111 and light receiver 115 in a different housing. As with laser light source 111 and light receiver 115, first beam splitter 112*a*, second beam splitter 112*b*, third beam splitter 112*c*, AOM 114*b*, mirror 113, and the like do not need to be included in one housing.

Laser light source 111 may be, for example, a He—Ne laser oscillator or a laser diode.

[Notifier 17]

A description will be given with reference back to FIG. 1. For example, when an anomaly in the welded part is detected by detector 12*b*, notifier 17 notifies notification information to the user. The notification information is, for example, information about an anomaly in the welded part. The information about an anomaly in the welded part may include at least one of information indicating whether an anomaly occurs in the welded part, information indicating the degree of anomaly in the welded part, or information about the type of anomaly in the welded part (for example, production of spatter, production of a crack or the like). The degree of anomaly is a statistic which indicates the degree of an anomaly, and is specifically a numerical value which indicates the possibility of whether an anomaly occurs in the welded part.

[Information Terminal 20]

Although information terminal 20 is a portable information terminal, such as a notebook personal computer, a smartphone, or a tablet terminal, which is used by the user of anomaly detection device 10, information terminal 20 may be a stationary computer device. Information terminal 20 includes communicator 21, controller 22, storage 23, receiver 24, and presenter 25.

[Communicator 21]

Although communicator 21 is a communication circuit (or a communication module) with which information terminal 20 is connected to anomaly detection device 10 via a local communication network, communicator 21 may be a communication circuit (or a communication module) for performing connection via a wide area communication network. Although communication performed by communicator 21 is wireless communication, the communication may be wired communication. Communication standards for communication performed by communicator 21 are not particularly limited.

[Controller 22]

Controller 22 performs various types of information processing on information terminal 20 based on an operation input received by receiver 24. Although controller 22 is realized, for example, by a microcomputer, controller 22 may be realized by a processor.

[Storage 23]

Storage 23 is a storage device in which dedicated application programs to be executed by controller 22 and the like are stored. Storage 23 is realized, for example, by a semiconductor memory or the like.

[Receiver 24]

Receiver 24 is an input interface which receives the operation input performed by the user who uses information terminal 20. For example, receiver 24 receives an operation input performed by the user for transmitting a method of presenting the notification information to anomaly detection device 10. Specifically, receiver 24 is realized by a touch panel display or the like. For example, when receiver 24 incorporates a touch panel display, the touch panel display functions as presenter 25 and receiver 24. Receiver 24 is not limited to the touch panel display, and may be, for example, a keyboard, a pointing device (such as a touch pen or a mouse), hardware buttons, or the like. When receiver 24 receives an input of a voice, receiver 24 may be a microphone. When receiver 24 receives an input of a gesture, receiver 24 may be a camera.

[Presenter 25]

Presenter 25 presents the notification information notified by anomaly detection device 10. Presenter 25 is, for example, a display device which displays image information including characters and the like. Presenter 25 may further include a voice output device which outputs voice information. The display device is, for example, a display which includes, as a display device, a liquid crystal (LC) panel, an organic electro luminescence (EL) panel, or the like. The voice output device is, for example, a speaker or earphones. For example, presenter 25 may display the image information on the display device, may output the voice information with the voice output device, or may present both the image information and the voice information.

[2. Operation]

Figure 4:
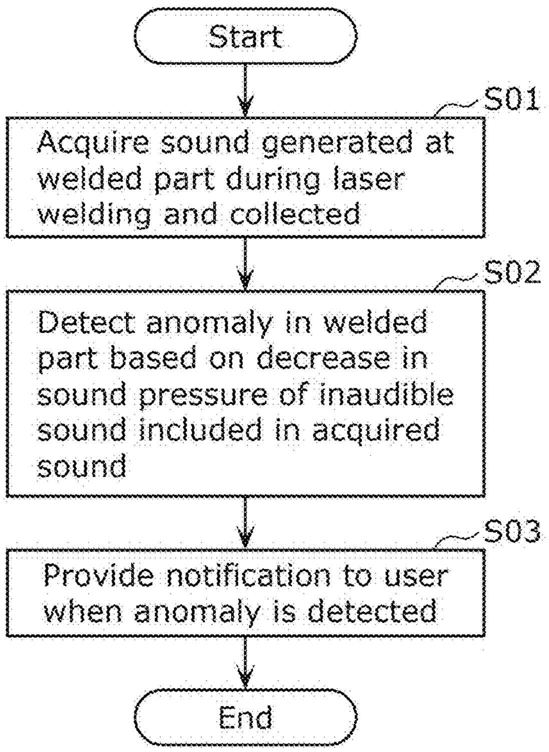
FIG. 4 is a flowchart showing an example of the operation of the anomaly detection system in the embodiment.

Then, the operation of anomaly detection system 100 in the embodiment will be specifically described with reference to drawings. FIG. 4 is a flowchart showing an example of the operation of anomaly detection system 100 in the embodiment.

For example, when receiver 24 of information terminal 20 receives an input operation for providing an instruction to start anomaly detection processing, controller 22 of information terminal 20 outputs the instruction to anomaly detection device 10 via communicator 21 (not shown).

Then, when communicator 11 of anomaly detection device 10 acquires the instruction, information processor 12 causes sound collector 16 to collect a sound generated at the welded part (not shown).

Then, acquirer 12*a* of anomaly detection device 10 acquires the sound which is generated at the welded part during laser welding and is collected by sound collector 16 (S01). More specifically, acquirer 12*a* acquires an electrical signal corresponding to the sound collected by sound collector 16. Then, acquirer 12*a* outputs the acquired electrical signal to detector 12*b*. Sound collector 16 is, for example, a laser microphone. In this way, sound collector 16 can collect a sound in a band broader than a normal microphone. Since sound collector 16 does not include a diaphragm unlike the normal microphone, it is possible to collect a sound even in an environment of electromagnetic waves, a high temperature, high heat, metal pieces, or the like.

Then, detector 12*b* of anomaly detection device 10 detects an anomaly in the welded part based on a change in an inaudible sound included in the sound acquired by acquirer 12*a* in step S01 (S02). The change in the inaudible sound is, for example, a change in the sound pressure of the inaudible sound. For example, in step S02, detector 12*b* detects an anomaly in the welded part based on a decrease in the sound pressure of the inaudible sound included in the sound acquired by acquirer 12*a*. More specifically, in step S02, detector 12*b* detects an anomaly in the welded part based on a decrease in the sound pressure of a sound in a frequency band of 100 kHz or higher and 200 kHz or lower in the inaudible sound.

Then, when an anomaly in the welded part is detected by detector 12*b* in step S02, notifier 17 of anomaly detection device 10 provides a notification to the user (S03). Specifically, when an anomaly in the welded part is detected by detector 12*b*, notifier 17 notifies notification information to the user. Since the notification information has been described previously, the description of the notification information is omitted here.

Figure 5:
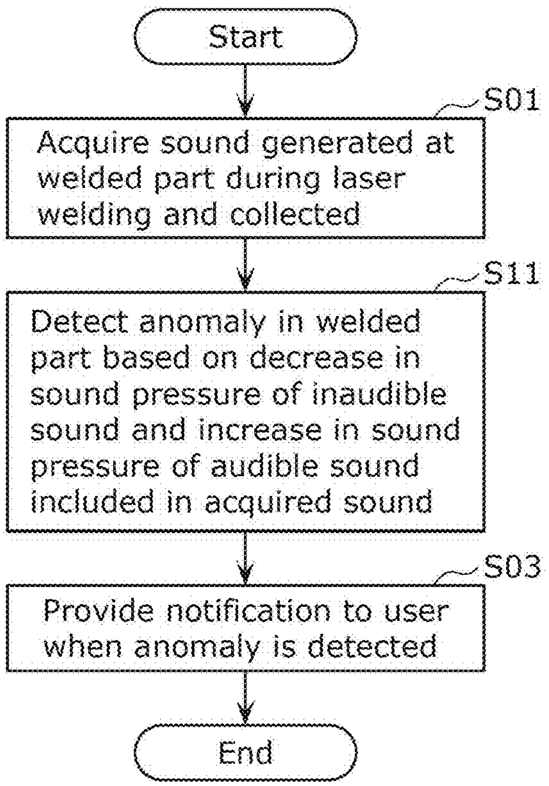
FIG. 5 is a flowchart showing another example of the operation of the anomaly detection system in the embodiment.

Although in step S02, the example is shown where detector 12*b* detects an anomaly in the welded part based on a decrease in the sound pressure of the inaudible sound included in the sound generated at the welded part, detector 12*b* may detect an anomaly in the welded part based on an increase in the sound pressure of an audible sound included in the sound acquired by acquirer 12*a* in step S01 in addition to a decrease in the sound pressure of the inaudible sound. FIG. 5 is a flowchart showing another example of the operation of anomaly detection system 100 in the embodiment. In FIGS. 4 and 5, the same step numbers are added to the same processing steps, and the description of the same processing steps are omitted or simplified.

For example, as shown in FIG. 5, detector 12*b* detects an anomaly in the welded part based on a decrease in the sound pressure of the inaudible sound included in the sound acquired in step S01 and an increase in the sound pressure of the audible sound included in the acquired sound (S11).

In steps S02 and S11 (so-called detecting), detector 12*b* may detect whether an anomaly occurs in the welded part by extracting a feature amount from sound information about the sound acquired in step S01 and performing threshold processing on the extracted feature amount.

[Operation in Detecting]

An example of the operation of anomaly detection device 10 in the detecting will be described below.

First Example

Figure 6:
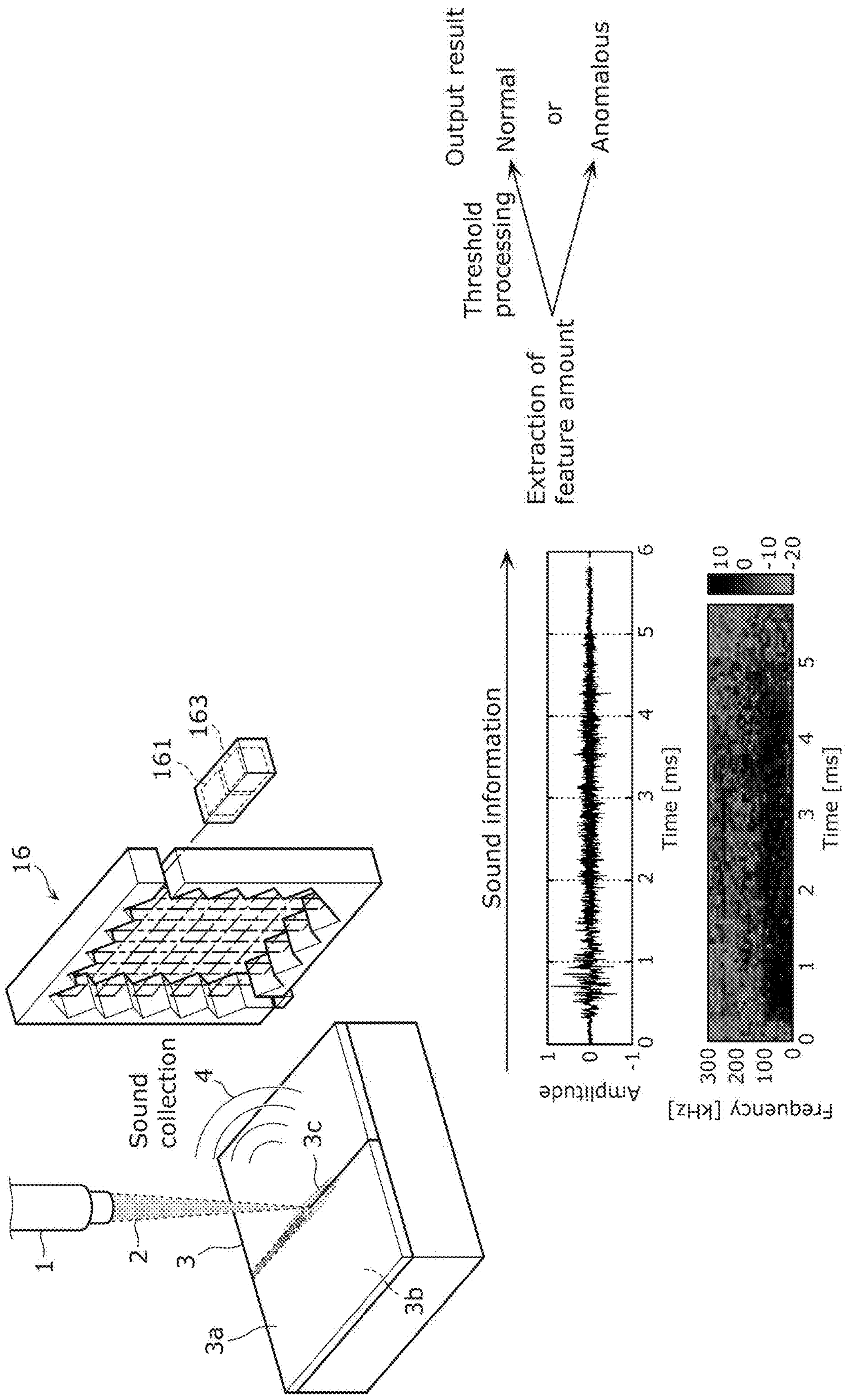
FIG. 6 is a diagram for illustrating a first example of the operation of an anomaly detection device in detecting.

FIG. 6 is a diagram for illustrating a first example of the operation of anomaly detection device 10 in the detecting. As shown in FIG. 6, in laser welding, a laser welding device (not shown) applies laser light 2 emitted from laser scanner 1 to welded part 3*c* of welding target 3. For example, welding target 3 is two metal plates. Laser light 2 is applied to the side of front surface 3*a* of welding target 3. Sound 4 is a sound which is generated at welded part 3*c* when laser light 2 is applied to welded part 3*c*, and includes, for example, a sound which is generated at welded part 3*c* when laser light 2 is applied with an impurity adhering to welded part 3*c*. An anomaly in welded part 3*c* occurs, for example, when an impurity adheres to front surface 3*a* of welded part 3*c*. An anomaly in welded part 3*c* is production of spatter in front surface 3*a* of welded part 3*c* and production of a crack in back surface 3*b* of welded part 3*c*.

Sound collector 16 (for example, a laser microphone) collects sound 4 generated at welded part 3*c* during laser welding. For example, sound collector 16 (laser microphone) collects a sound (more specifically, a sound propagating in the direction of sound collector 16 (laser microphone)) of the sound (more specifically, a sound propagating spherically from welded part 3*c*) generated at welded part 3*c* during laser welding but sound collector 16 may collect all the sounds. Detector 12*b* of anomaly detection device 10 extracts a feature amount from sound information about the sound collected by acquirer 12*a*. Specifically, detector 12*b* extracts the sound pressure of an inaudible sound (for example, a sound in a frequency band of 100 kHz or higher and 200 kHz or lower) and the sound pressure of an audible sound (for example, a sound in a frequency band of 1 kHz or higher and less than 20 kHz) included in the collected sound. Detector 12*b* performs threshold processing to determine a decrease in the sound pressure of the inaudible sound and an increase in the sound pressure of the audible sound. Detector 12*b* detects whether an anomaly occurs in welded part 3*c* (whether welded part 3*c* is normal or anomalous) based on a decrease in the sound pressure of the inaudible sound and an increase in the sound pressure of the audible sound which are determined.

Although in this example, anomaly detection device 10 includes one sound collector 16, the number of sound collectors 16 is not particularly limited, and anomaly detection device 10 may include two or more sound collectors 16. In this case, for example, anomaly detection device 10 may collect all the sounds generated at welded part 3*c* during welding or may collect sounds (more specifically, sounds propagating in the directions of two or more sound collectors 16) of all the sounds by using two or more sound collectors 16.

Second Example

Figure 7:
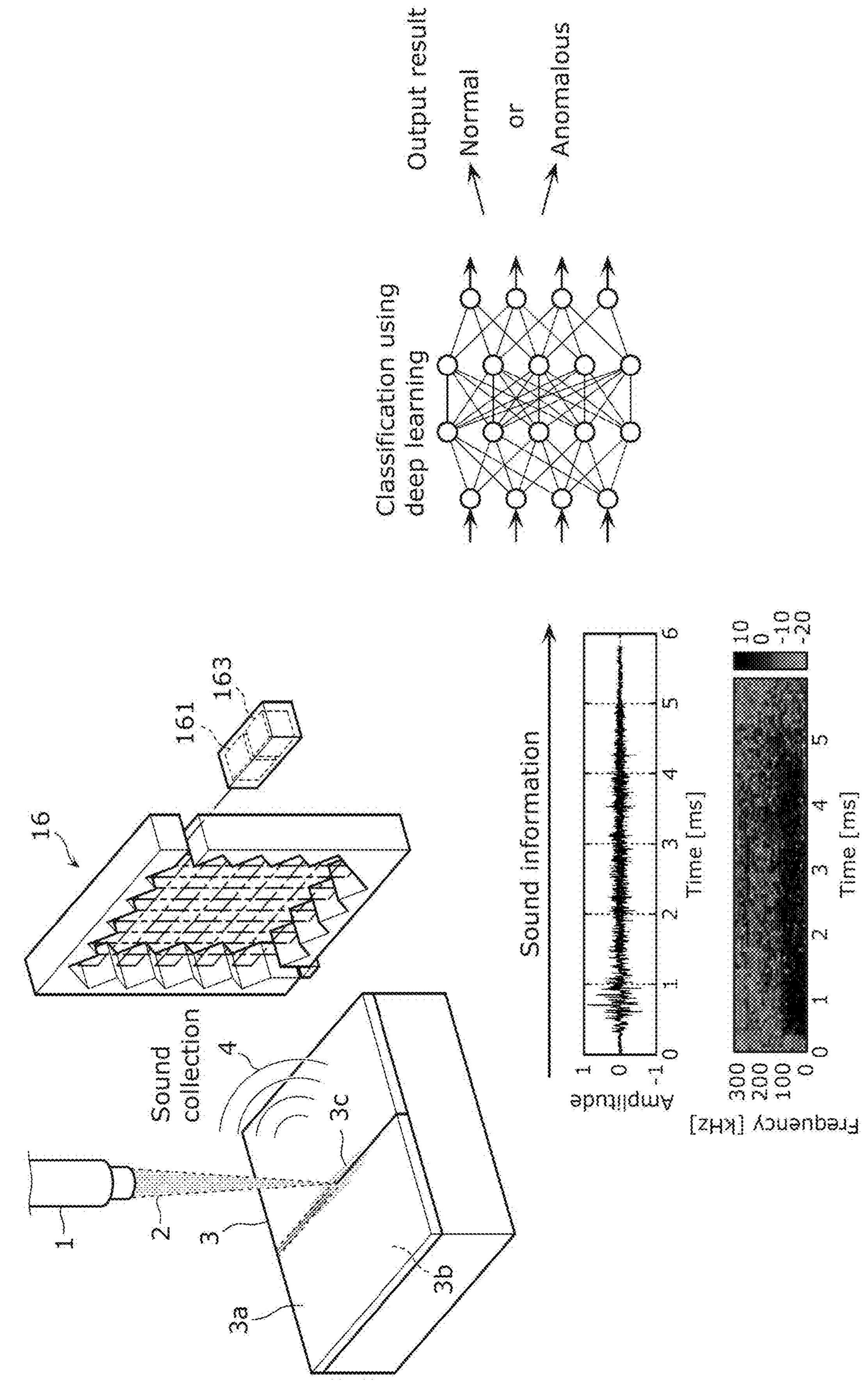
FIG. 7 is a diagram for illustrating a second example of the operation of the anomaly detection device in the detecting.

Then, a second example of the operation of anomaly detection device 10 in the detecting will be described. FIG. 7 is a diagram for illustrating the second example of the operation of anomaly detection device 10 in the detecting.

Although in the first example of the operation, detector 12*b* performs the threshold processing to detect whether an anomaly occurs in welded part 3*c*, in the second example of the operation, detector 12*b* uses trained machine learning model 15 to detect whether an anomaly occurs in welded part 3*c*. Differences from the first example will be mainly described below, and repeated description is omitted or simplified.

Detector 12*b* of anomaly detection device 10 detects an anomaly in welded part 3*c* based on the result of an output obtained by inputting the sound information about the sound acquired by acquirer 12*a* to machine learning model 15. Machine learning model 15 shows a relationship between the sound (so-called welding sound) generated at welded part 3*c* during laser welding and whether an anomaly occurs in welded part 3*c*. Although machine learning model 15 is, for example, a convolutional neural network (CNN), machine learning model 15 is not limited to the convolutional neural network. In the second example, classification using machine learning model 15 is performed. The result of the output is, for example, whether an anomaly occurs in welded part 3*c*.

The sound information input to trained machine learning model 15 is, for example, image data of a spectrogram of the welding sound or image data of a frequency characteristic of the welding sound. The information is, for example, image data in a format such as joint photographic experts group (JPEG) or basic multilingual plane (BMP).

Figure 8:
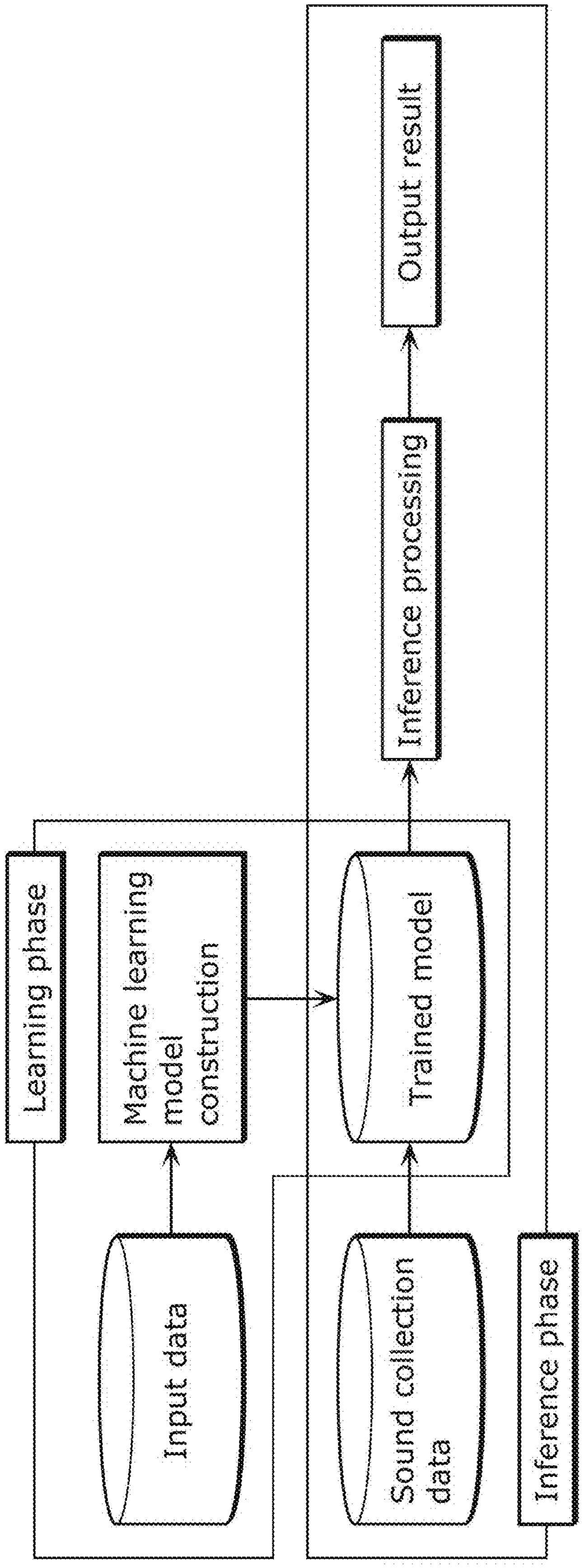
FIG. 8 is a diagram for illustrating a learning phase in a machine learning model and an inference phase using the machine learning model.

Here, the learning of machine learning model 15 and the utilization of trained machine learning model 15 will be described. FIG. 8 is a diagram for illustrating a learning phase in machine learning model 15 and a utilization phase (also referred to as an inference phase) using machine learning model 15.

In the learning phase, learner 14 of anomaly detection device 10 uses, for example, teacher data to perform learning of the machine learning model. In storage 13, the teacher data is stored. For example, the teacher data may include: first data of the sound information about the sound generated at welded part 3*c* during laser welding and an annotation indicating an anomaly in welded part 3*c*; and second data of the sound information and an annotation indicating no anomaly (that is, normality) in welded part 3*c*.

In the inference phase, detector 12*b* of anomaly detection device 10 inputs the sound information (for example, an image of the spectrogram of the collected sound or an image of the frequency characteristic of the collected sound) about the sound collected by sound collector 16 to trained machine learning model 15 (so-called trained model). Then, detector 12*b* performs inference processing based on the result of an output from machine learning model 15, and detects an anomaly in welded part 3*c* based on the result of the output of the inference processing (for example, whether an anomaly occurs).

Third Example

Figure 9:
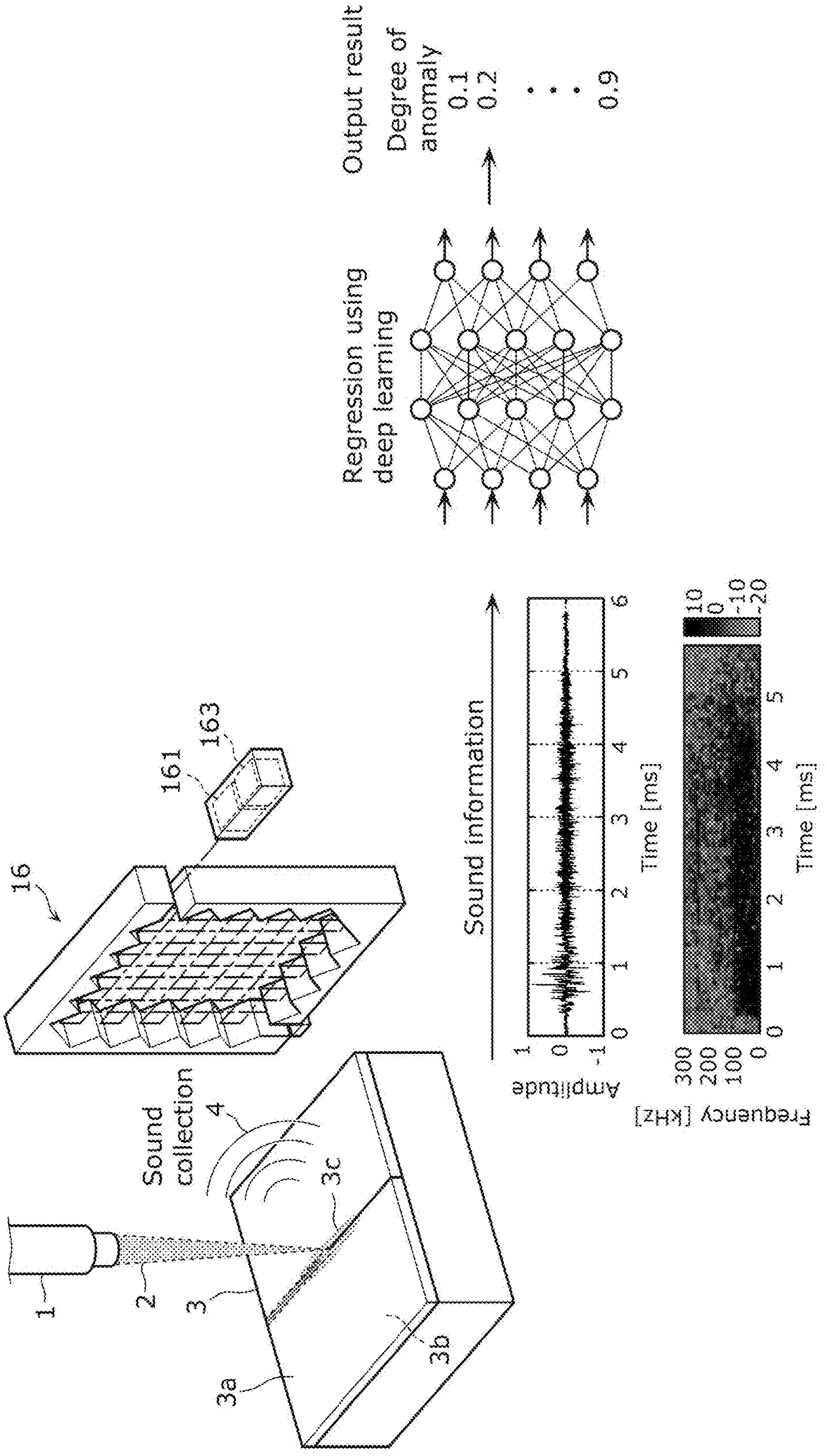
FIG. 9 is a diagram for illustrating a third example of the operation of the anomaly detection device in the detecting.

Then, a third example of the operation of anomaly detection device 10 in the detecting will be described. FIG. 9 is a diagram for illustrating the third example of the operation of anomaly detection device 10 in the detecting.

Although in the second example of the operation, trained machine learning model 15 is used to detect whether an anomaly occurs in welded part 3*c*, in the third example of the operation, trained machine learning model 15 is used to detect whether an anomaly occurs in welded part 3*c* based on the degree of anomaly in welded part 3*c*. Differences from the second example will be mainly described below, and repeated description is omitted or simplified.

Detector 12*b* of anomaly detection device 10 detects an anomaly in welded part 3*c* based on the result of an output obtained by inputting the sound information about the sound acquired by acquirer 12*a* to machine learning model 15. Machine learning model 15 shows a relationship between the sound (so-called welding sound) generated at welded part 3*c* during laser welding and whether an anomaly occurs in welded part 3*c*. Although machine learning model 15 is, for example, the convolutional neural network (CNN), machine learning model 15 is not limited to the convolutional neural network. In the third example, regression using machine learning model 15 is performed. The result of the output is, for example, the degree of anomaly in welded part 3*c*. The degree of anomaly is a statistic which indicates the degree of an anomaly, and is specifically a numerical value which indicates the possibility of whether an anomaly occurs in the welded part.

The sound information input to trained machine learning model 15 is, for example, time series data of the welding sound. The time series data is, for example, the time waveform of the sound, and more specifically, the information which is time series numerical data in a format such as a waveform audio file format (WAV) may include, for example, at least one of the frequency band of the sound, the duration of the sound, a sound pressure, or a waveform.

Here, the learning of machine learning model 15 and the utilization of trained machine learning model 15 will be described with reference back to FIG. 8.

In the learning phase, for example, learner 14 of anomaly detection device 10 uses the waveform or the spectrogram of a normal welding sound as input data to perform learning of the machine learning model. In storage 13, the waveform or the spectrogram of the normal welding sound is stored. Machine learning model 15 is, for example, an autoencoder.

In the inference phase, detector 12*b* of anomaly detection device 10 inputs the sound information about the sound which is collected by sound collector 16 during laser welding and is acquired by acquirer 12*a* (for example, the waveform or the spectrogram of the sound) to trained machine learning model 15 (so-called trained model). Then, detector 12*b* performs the inference processing based on the result of an output from machine learning model 15 (for example, sound information encoded and decoded by the autoencoder) to detect an anomaly in welded part 3*c* based on the result of the output of the inference processing (for example, the degree of anomaly).

[3. Effects and Like]

As described above, anomaly detection device 10 according to the embodiment includes: acquirer 12*a* that acquires sound 4 which is generated at welded part 3*c* during laser welding and is collected by sound collector 16; and detector 12*b* that detects an anomaly in welded part 3*c* based on a change in the inaudible sound included in sound 4 acquired by acquirer 12*a*.

In this way, anomaly detection device 10 detects an anomaly in welded part 3*c* based on the inaudible sound included in sound 4 generated at welded part 3*c* during laser welding, and thus anomaly detection device 10 is unlikely to be affected by various audible sounds generated around sound collector 16, that is, sounds resulting in noise. Since the band of the inaudible sound is unlikely to be affected by sounds resulting in noise, when the inaudible sound is changed (for example, when the sound pressure of the inaudible sound is changed), anomaly detection device 10 can detect the change. Hence, anomaly detection device 10 can enhance the accuracy of detection of an anomaly in welded part 3*c*.

In anomaly detection device 10 according to the aspect of the present disclosure, detector 12*b* may detect an anomaly in welded part 3*c* based on a decrease in the sound pressure of the inaudible sound included in sound 4.

In this way, anomaly detection device 10 detects an anomaly in welded part 3*c* based on a decrease in the sound pressure of the inaudible sound included in sound 4 generated at welded part 3*c* during laser welding, and thus anomaly detection device 10 is unlikely to be affected by various audible sounds generated around sound collector 16, that is, sounds resulting in noise. Since the band of the inaudible sound is unlikely to be affected by sounds resulting in noise, when the sound pressure of the inaudible sound is decreased, the anomaly detection device can detect the decrease in the sound pressure. It is assumed that when an anomaly occurs in welded part 3*c*, the sound pressure of the inaudible sound included in sound 4 generated at welded part 3*c* tends to be decreased. Hence, anomaly detection device 10 can enhance the accuracy of detection of an anomaly in welded part 3*c*.

Anomaly detection device 10 according to the embodiment may further include notifier 17 that provides a notification to the user when detector 12*b* detects an anomaly in welded part 3*c*.

In this way, anomaly detection device 10 can notify the occurrence of an anomaly in welded part 3*c* to the user, and thus the user can grasp whether an anomaly occurs in welded part 3*c*.

In anomaly detection device 10 according to the embodiment, sound collector 16 may be a laser microphone.

In this way, anomaly detection device 10 uses the laser microphone as sound collector 16 to be able to acquire a sound in a band broader than a case where the normal microphone is used, and thus a larger amount of information can be obtained. Hence, anomaly detection device 10 can detect an anomaly in the welded part based on a larger amount of information. Therefore, anomaly detection device 10 can extract a larger feature amount, and thus it is possible to enhance the accuracy of detection of an anomaly in welded part 3*c*. Although in the normal microphone (for example, a microphone including a diaphragm), it is difficult to collect a sound due to electromagnetic waves, a high temperature, the adhesion of metal pieces, or the like, anomaly detection device 10 uses the laser microphone to be able to collect a sound even in an environment where it is difficult to collect a sound with the normal microphone. Hence, anomaly detection device 10 can detect an anomaly in more environments.

In anomaly detection device 10 according to the embodiment, the inaudible sound may be a sound in a frequency band of 100 kHz or higher and 200 kHz or lower.

In this way, anomaly detection device 10 can extract, as the feature amount, a sound in a specific frequency band in the inaudible sound. Hence, anomaly detection device 10 can accurately detect an anomaly in welded part 3*c* based on the extracted feature amount.

In anomaly detection device 10 according to the embodiment, detector 12*b* may further detect an anomaly in welded part 3*c* based on an increase in the sound pressure of the audible sound included in sound 4.

In this way, anomaly detection device 10 can extract a larger feature amount based on the inaudible sound and the audible sound included in sound 4. Hence, anomaly detection device 10 can enhance the accuracy of detection of an anomaly in welded part 3*c*.

In anomaly detection device 10 according to the embodiment, detector 12*b* may detect an anomaly in welded part 3*c* based on the result of an output obtained by inputting the sound information about sound 4 acquired by acquirer 12*a* to trained machine learning model 15.

In this way, anomaly detection device 10 uses machine learning model 15 to be able to automatically extract the feature amount from the sound information, and thereby can more easily detect an anomaly in welded part 3*c*.

In anomaly detection device 10 according to the embodiment, the sound information may include at least one of image data of the spectrogram of sound 4, image data of the frequency characteristic of sound 4, or time series data of sound 4.

In this way, anomaly detection device 10 uses the sound information from which the feature amount of data is easily extracted to be able to facilitate the extraction of regularity of data (so-called feature amount) performed by machine learning model 15.

In anomaly detection device 10 according to the embodiment, the time series data of sound 4 may be the time waveform of sound 4.

In this way, anomaly detection device 10 uses the time waveform of sound 4 as the time series data of sound 4 to be able to facilitate the extraction of the feature amount about an increase and a decrease in the sound volume (that is, the sound pressure) performed by machine learning model 15.

In anomaly detection device 10 according to the embodiment, the result of the output may be whether an anomaly occurs in welded part 3*c* or the degree of anomaly.

In this way, anomaly detection device 10 can detect an anomaly in welded part 3*c* based on whether an anomaly occurs in welded part 3*c* or the degree of anomaly.

In anomaly detection device 10 according to the embodiment, sound 4 may be a sound that is generated at welded part 3*c* when laser light is applied to welded part 3*c*, and may include a sound that is generated when an impurity adheres to welded part 3*c*.

In this way, anomaly detection device 10 can detect an anomaly in welded part 3*c* based on sound 4.

In anomaly detection device 10 according to the embodiment, the anomaly in welded part 3*c* may be at least one of production of spatter or production of a crack in welded part 3*c*.

In this way, anomaly detection device 10 can detect not only an anomaly in front surface 3*a* of welded part 3*c* but also an anomaly which occurs inside welding target 3 or in back surface 3*b*.

Anomaly detection device 10 according to the embodiment includes: a laser microphone that collects sound 4 which is generated at the welded part during laser welding; and detector 12*b* that detects an anomaly in welded part 3*c* based on sound 4 collected by the laser microphone.

In this way, anomaly detection device 10 can collect a sound using the laser microphone even in an environment where it is difficult to collect a sound with the normal microphone. For example, although in the normal microphone (for example, a microphone including a diaphragm), it is difficult to collect a sound due to electromagnetic waves, a high temperature, the adhesion of metal pieces, or the like, the laser microphone does not include a diaphragm unlike the normal microphone, and thus it is possible to collect a sound even in an environment of electromagnetic waves, a high temperature, high heat, metal pieces, or the like.

An anomaly detection method according to the embodiment includes: acquiring (S01) sound 4 which is generated at welded part 3*c* during laser welding and is collected by sound collector 16; and detecting (S02) an anomaly in welded part 3*c* based on a change in an inaudible sound included in sound 4 acquired in the acquiring (Sot).

In this way, a device which performs the anomaly detection method detects an anomaly in welded part 3*c* based on the inaudible sound included in sound 4 generated at welded part 3*c* during laser welding, and thus the device is unlikely to be affected by various audible sounds generated around sound collector 16, that is, sounds resulting in noise. Since the band of the inaudible sound is unlikely to be affected by sounds resulting in noise, when the inaudible sound is changed (for example, when the sound pressure of the inaudible sound is changed), the device which performs the anomaly detection method can detect the change. Hence, the device which performs the anomaly detection method can enhance the accuracy of detection of an anomaly in welded part 3*c*.

In the anomaly detection method according to the embodiment, in the detecting (S02), an anomaly in welded part 3*c* may be detected based on a decrease in the sound pressure of the inaudible sound included in sound 4.

In this way, the device which performs the anomaly detection method detects an anomaly in welded part 3*c* based on a decrease in the sound pressure of the inaudible sound included in sound 4 generated at welded part 3*c* during laser welding, and thus the device is unlikely to be affected by various audible sounds generated around sound collector 16, that is, sounds resulting in noise. Since the band of the inaudible sound is unlikely to be affected by sounds resulting in noise, when the sound pressure of the inaudible sound is decreased, the device which performs the anomaly detection method can detect the decrease in the sound pressure. It is assumed that when an anomaly occurs in welded part 3*c*, the sound pressure of the inaudible sound included in sound 4 generated at welded part 3*c* tends to be decreased. Hence, the device which performs the anomaly detection method can enhance the accuracy of detection of an anomaly in welded part 3*c*.

An anomaly detection method according to the embodiment includes: collecting, by a laser microphone, sound 4 which is generated at welded part 3*c* during laser welding; and detecting an anomaly in welded part 3*c* based on sound 4 collected by the laser microphone.

In this way, the anomaly detection method can collect a sound using the laser microphone even in an environment where it is difficult to collect a sound with the normal microphone. For example, although in the normal microphone (for example, a microphone including a diaphragm), it is difficult to collect a sound due to electromagnetic waves, a high temperature, the adhesion of metal pieces, or the like, the laser microphone does not include a diaphragm, and thus it is possible to collect a sound even in an environment of electromagnetic waves, a high temperature, high heat, metal pieces, or the like.

(Variation)

Then, a variation of the embodiment will be specifically described with reference to drawings.

[1. Configuration]

Figure 10:
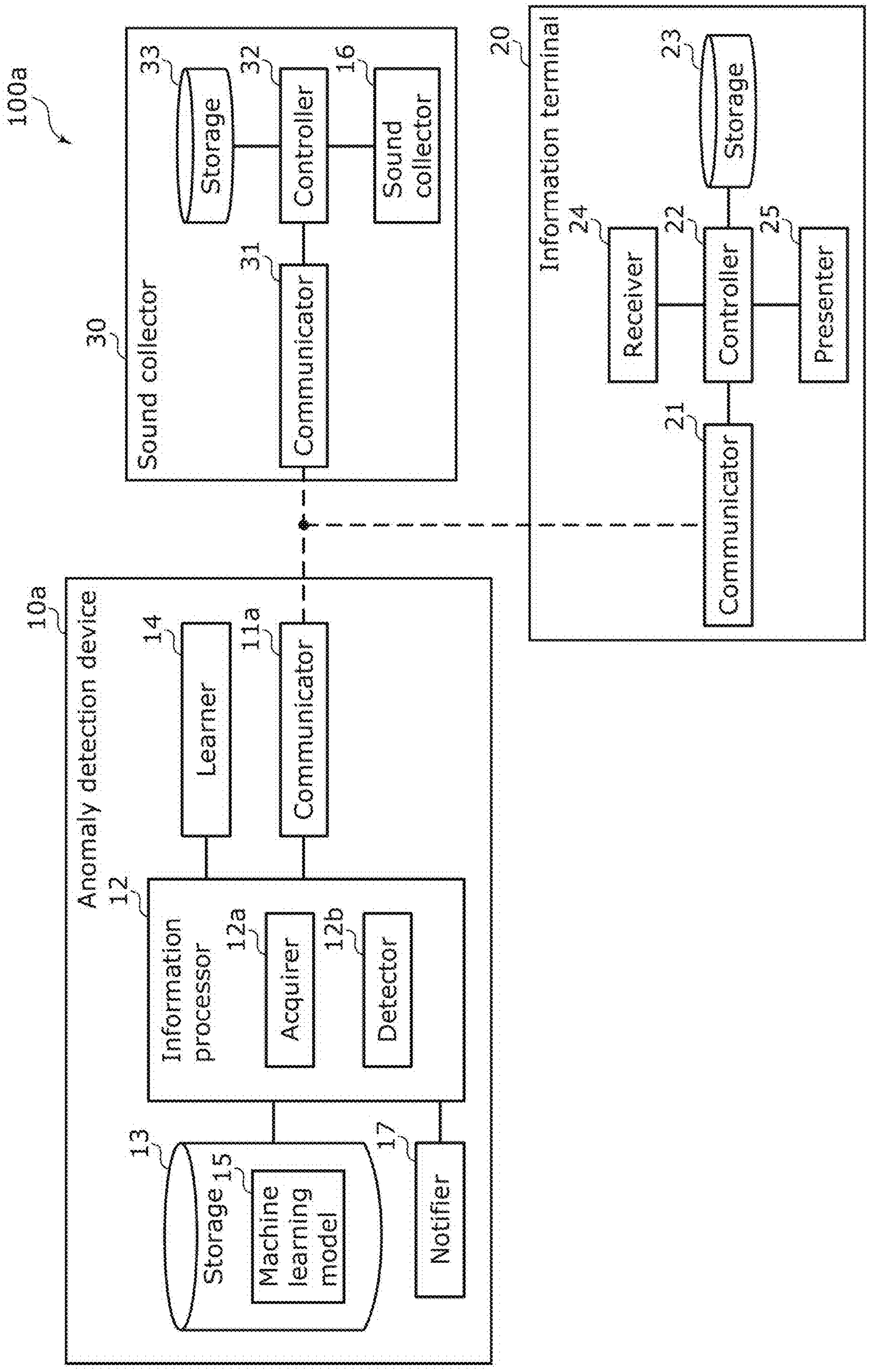
FIG. 10 is a block diagram showing an example of the functional configuration of an anomaly detection system in a variation of the embodiment.

FIG. 10 is a block diagram showing an example of the functional configuration of anomaly detection system 100*a* in the variation of the embodiment. In FIG. 10, the same configurations as in FIG. 1 are identified with the same reference signs. Although in anomaly detection system 100 in the embodiment, anomaly detection device 10 includes sound collector 16, the variation differs from the embodiment in that anomaly detection device 10*a* does not include sound collector 16 and anomaly detection system 100*a* includes sound collection device 30. Differences from the embodiment will be mainly described below, and repeated description is omitted or simplified.

[Anomaly Detection Device 10*a*]

Anomaly detection device 10*a* according to the variation acquires a sound collected by sound collection device 30. Anomaly detection device 10*a* includes, for example, communicator 11*a*, information processor 12, storage 13, learner 14, and notifier 17. Configurations which are different from anomaly detection device 10 according to the embodiment will be described below.

[Communicator 11*a*]

Communicator 11*a* is a communication circuit (or a communication module) with which anomaly detection device 10*a* communicates with information terminal 20 and sound collection device 30. Although communicator 11*a* includes a communication circuit (or a communication module) for performing communication via a local communication network, communicator 11*a* may include a communication circuit (or a communication module) for performing communication via a wide area communication network. Although communicator 11*a* is, for example, a wireless communication circuit which performs wireless communication, communicator 11*a* may be a wired communication circuit which performs wired communication. Communication standards for communication performed by communicator 11*a* are not particularly limited.

[Sound Collection Device 30]

Sound collection device 30 includes, for example, communicator 31, controller 32, storage 33, and sound collector 16. Since sound collector 16 is described in the embodiment, the description of sound collector 16 is omitted here.

[Communicator 31]

Communicator 31 is a communication circuit (or a communication module) with which sound collection device 30 communicates with anomaly detection device 10*a* and information terminal 20. Although communicator 31 includes a communication circuit (or a communication module) for performing communication via a local communication network, communicator 31 may include a communication circuit (or a communication module) for performing communication via a wide area communication network. Although communicator 31 is, for example, a wireless communication circuit which performs wireless communication, communicator 31 may be a wired communication circuit which performs wired communication. Communication standards for communication performed by communicator 31 are not particularly limited.

[Controller 32]

Controller 32 performs various types of information processing on sound collection device 30. Specifically, controller 32 transmits a control signal to sound collector 16 based on setting information stored in storage 33. Controller 32 is realized, for example, by a microcomputer, a processor, or the like. For example, the microcomputer, the processor, or the like of controller 32 executes computer programs stored in storage 33 to realize the functions of controller 32.

[2. Operation]

The variation differs from the embodiment in that sound collection device 30 converts a sound collected by sound collector 16 to an electrical signal and outputs the electrical signal to anomaly detection device 10*a*. Differences from the embodiment will be mainly described with reference back to FIGS. 4 and 5.

For example, when receiver 24 of information terminal 20 receives an input operation for providing an instruction to start anomaly detection processing, controller 22 of information terminal 20 outputs the instruction to anomaly detection device 10*a* via communicator 21 (not shown). Then, when anomaly detection device 10*a* acquires the instruction, anomaly detection device 10*a* outputs an instruction to start sound collection to sound collection device 30 (not shown). Information terminal 20 may output the instruction to anomaly detection device 10*a*, and also output the instruction to start sound collection to sound collection device 30.

In step S01, communicator 11*a* of anomaly detection device 10*a* acquires the sound (more specifically, the electrical signal corresponding to the sound) collected by sound collector 16 of sound collection device 30. Here, communicator 11*a* may acquire identification information for sound collection device 30 together with the electrical signal corresponding to the sound. In this way, when anomaly detection device 10*a* is connected to a plurality of sound collection devices 30 by communication, anomaly detection device 10*a* can identify sound collection device 30 which collects the acquired sound.

Then, detector 12*b* of anomaly detection device 10*a* performs step S02 in FIG. 4 or step S11 in FIG. 5 to detect an anomaly in the welded part.

Then, when detector 12*b* detects an anomaly in the welded part in step S02 or step S11, notifier 17 of anomaly detection device 10*a* notifies the information of the detection to the user (S03).

[3. Effects and Like]

Since anomaly detection device 10*a* according to the variation is configured as a separate device from sound collection device 30, the position of sound collection device 30 installed and the number of sound collection devices 30 installed can be changed as necessary according to the design of anomaly detection system 100*a*, and anomaly detection device 10*a* can be mounted into one integrated circuit.

EXAMPLES

Although the anomaly detection device and the anomaly detection method in the present disclosure will be specifically described below using Examples, Examples below are examples, and the present disclosure is not limited to only Examples below at all.

Sounds which were generated at a welded part during laser welding were collected under the following conditions, and based on the collected sounds, whether an anomaly in the welded part could be detected was verified. For normal welding and anomalous welding, (1) the results of the verification when sound information was time waveforms are shown in Example 1 and Comparative Example 1, and (2) the results of the verification when the sound information was spectrograms are shown in Example 2 and Comparative Example 2. In Example 3 and Comparative Example 3, (3) the results of the verification based on feature amounts (also referred to as acoustic feature amounts) of the sound information are shown.

[Number of Times Sounds were Collected]

Normal welding: 10 times

Anomalous welding: 10 times

Specifically, in the normal welding described above, the sound which was generated at the welded part when the normal welding was performed was collected 10 times. In the anomalous welding described above, metallic powder was applied to the front surface of a welding target so as to cause an anomaly during welding, and the sound which was generated at the welded part when the welding was performed under conditions in which an anomaly easily occurred was collected 10 times.

[Microphone]

Laser microphone (made by Xarion Laser Acoustics GmbH, one channel, sounds in a frequency band of 10 kHz to 1 MHz were collected).

[Distance from Welded Part to Microphone]

5 cm (1) when Sound Information was Time Waveforms

Example 1

Figure 11:
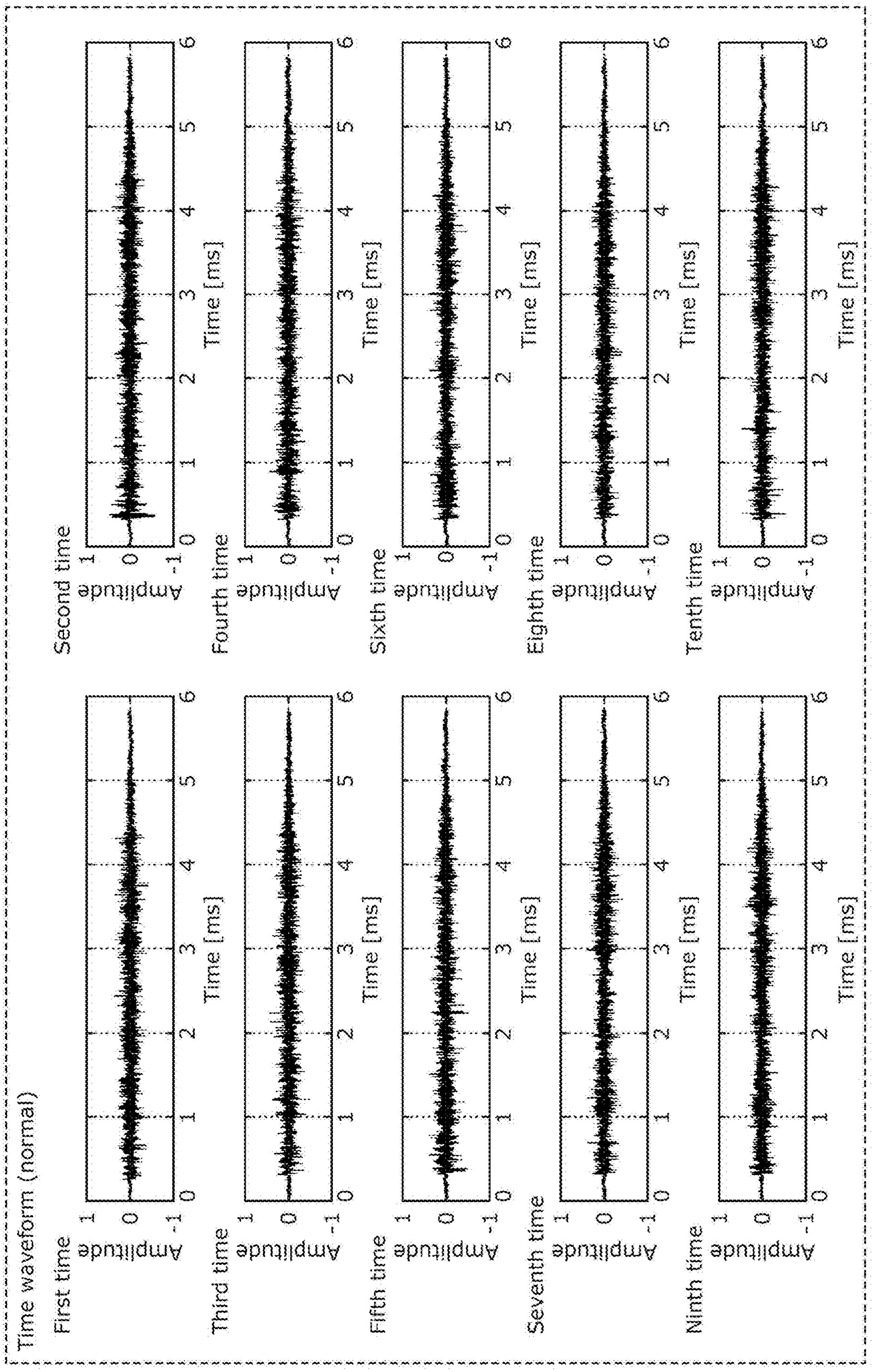
FIG. 11 is a diagram showing time waveforms of sounds collected when welding was normally performed.

FIG. 11 is a diagram showing time waveforms of sounds collected when welding was normally performed. As shown in FIG. 11, no areas were found where the amplitude was increased in the time waveforms of the welding sounds when the welding was normally performed. Hence, it was confirmed that when no anomaly occurred during the welding (that is, when the welding was normally performed), the magnitude (sound pressure) of the sound generated at the welded part was not increased.

Comparative Example 1

Figure 12:
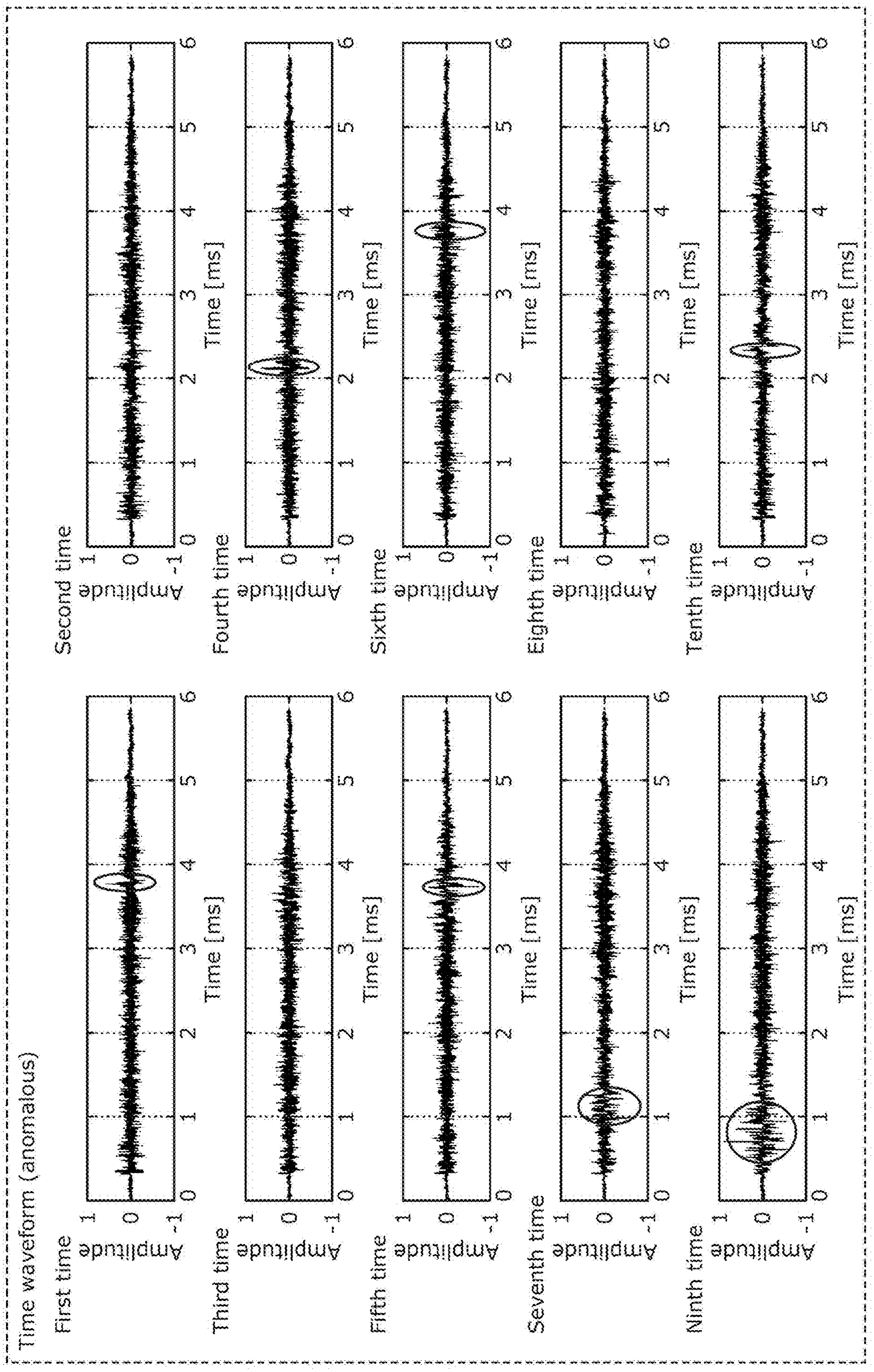
FIG. 12 is a diagram showing time waveforms of sounds collected when welding was performed under conditions in which an anomaly easily occurred.

FIG. 12 is a diagram showing time waveforms of sounds collected when welding was performed under conditions in which an anomaly easily occurred. As shown in FIG. 12, areas (surrounded by solid lines) were found where the amplitude was increased in the time waveforms of the sounds when the welding was performed under conditions in which an anomaly easily occurred. Hence, it is considered that when an anomaly occurs during the welding, the magnitude (sound pressure) of the sound generated at the welded part is increased.

(2) when Sound Information was Spectrograms

Example 2

Figure 13:
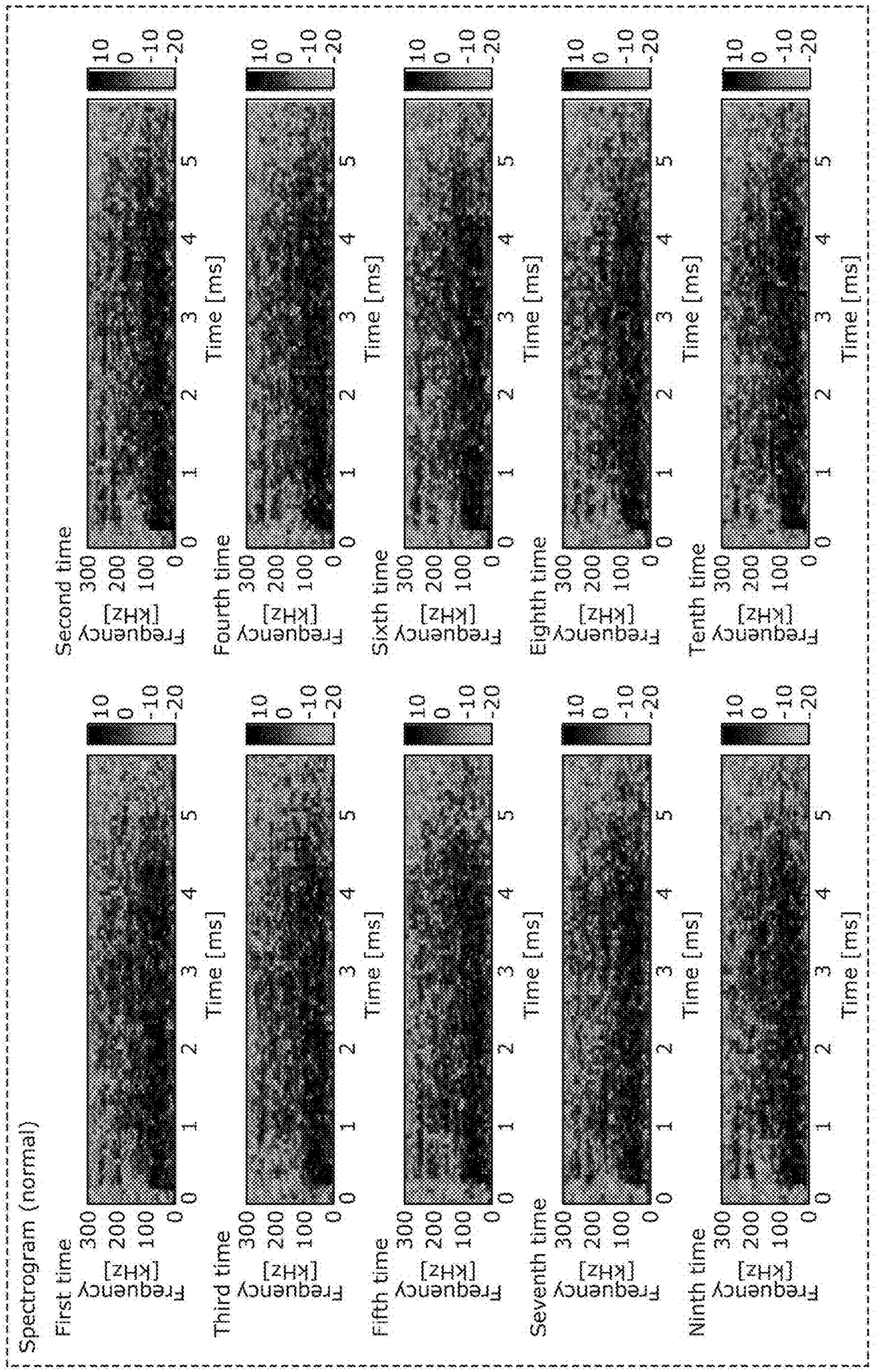
FIG. 13 is a diagram showing spectrograms of the sounds collected when the welding was normally performed.

FIG. 13 is a diagram showing spectrograms of the sounds collected when the welding was normally performed. As shown in FIG. 13, it was confirmed that since the sound pressure of a sound in a frequency band of 100 kHz or lower was high, the sound in a frequency band of 100 kHz or lower was generated at the welded part during welding. It was also confirmed that sounds in frequency bands around 200 kHz and 250 kHz were generated intermittently.

Comparative Example 2

Figure 14:
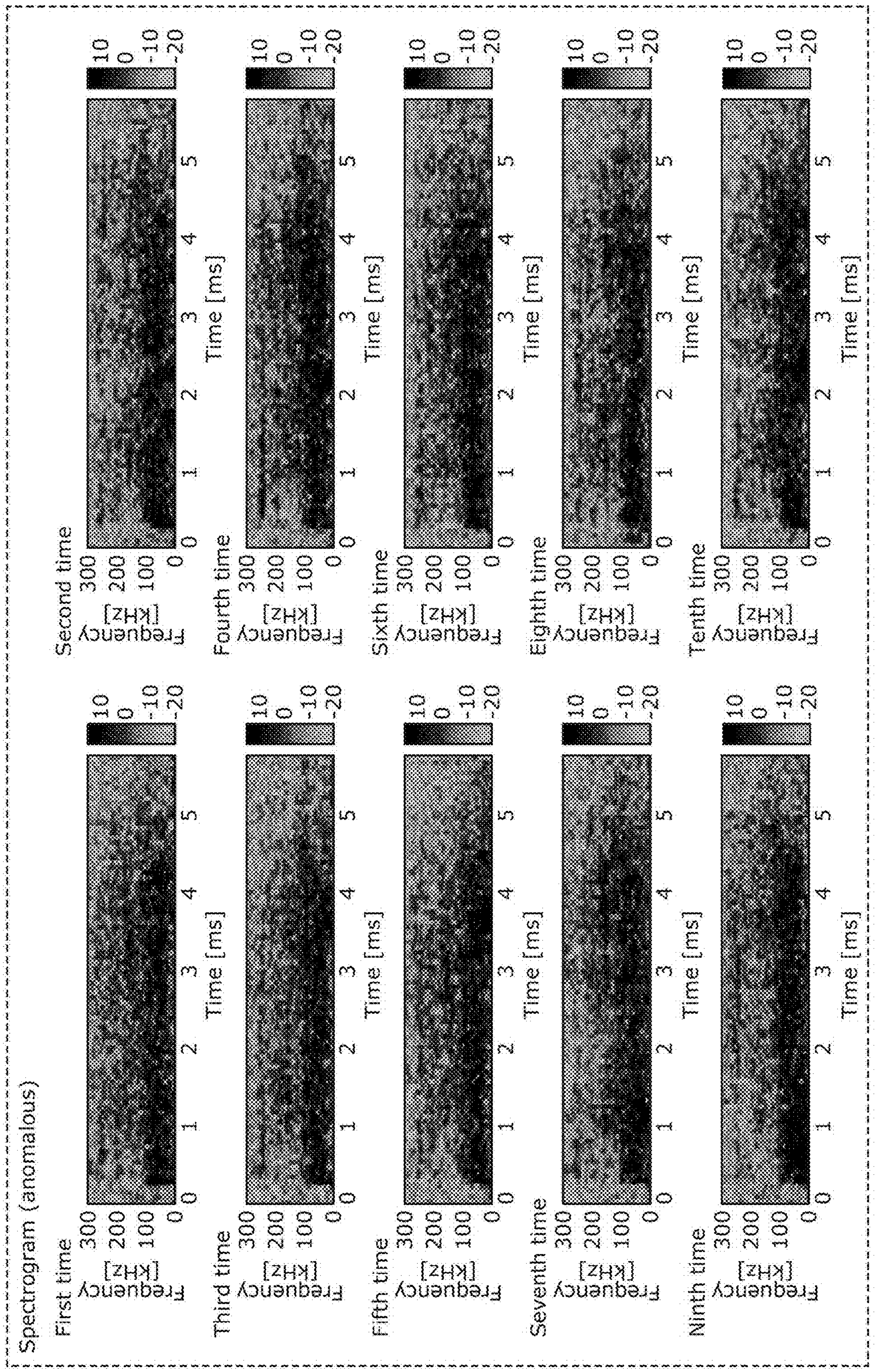
FIG. 14 is a diagram showing spectrograms of the sounds collected when the welding was performed under conditions in which an anomaly easily occurred.

FIG. 14 is a diagram showing spectrograms of the sounds collected when the welding was performed under conditions in which an anomaly easily occurred. As shown in FIG. 14, areas were found where a sound pressure level was increased in a frequency band of 20 kHz or lower was increased. On the other hand, as compared with Example 2, areas were found where a sound pressure level was decreased in a frequency band of 100 kHz or higher and 200 kHz or lower. The times of the areas at which the sound pressure level was decreased and the times of the areas when the sound pressure level was increased in a frequency band of 20 kHz or lower were substantially the same. Hence, it is considered that there is a tendency that when an anomaly occurs during welding, the sound pressure of an audible sound in 20 kHz or lower in sounds generated at the welded part is increased and the sound pressure of an inaudible sound in 100 kHz or higher and 200 kHz or lower is decreased.

(3) Feature Amount of Sound Information

It has been found from the results of (2) described above that (A) a sound pressure in a frequency band of 1 kHz or higher and 20 kHz or lower is increased when an anomaly occurs during welding and (B) there is a tendency that in sounds in a frequency band of 100 kHz or higher and 200 kHz or lower, the sound pressure of a sound in the frequency band when an anomaly occurs during welding is decreased as compared with the sound pressure of a sound in the frequency band when welding is normally performed.

Figure 15:
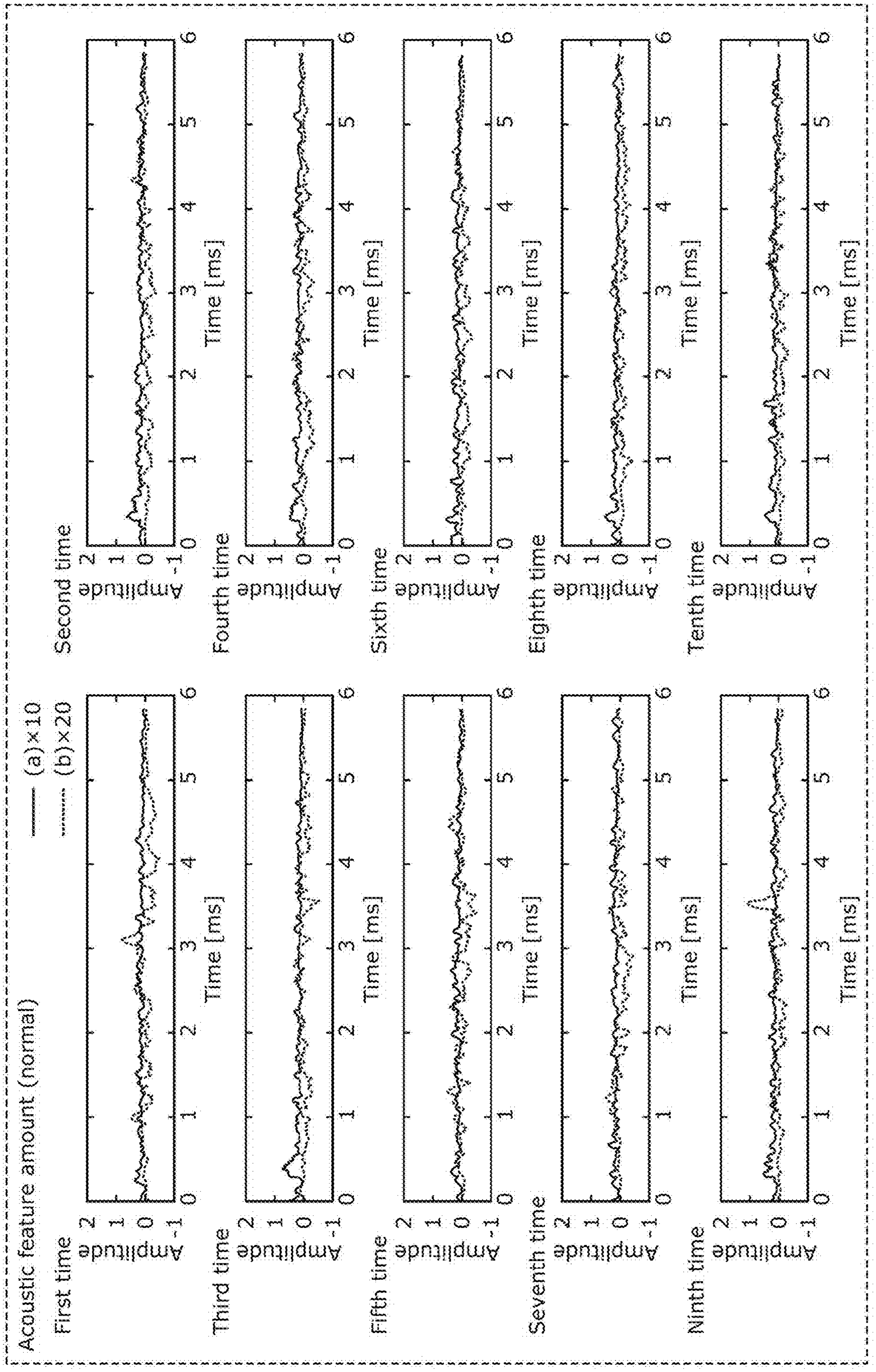
FIG. 15 is a diagram showing feature amounts (acoustic feature amounts) of the sounds collected when the welding was normally performed.
Figure 16:
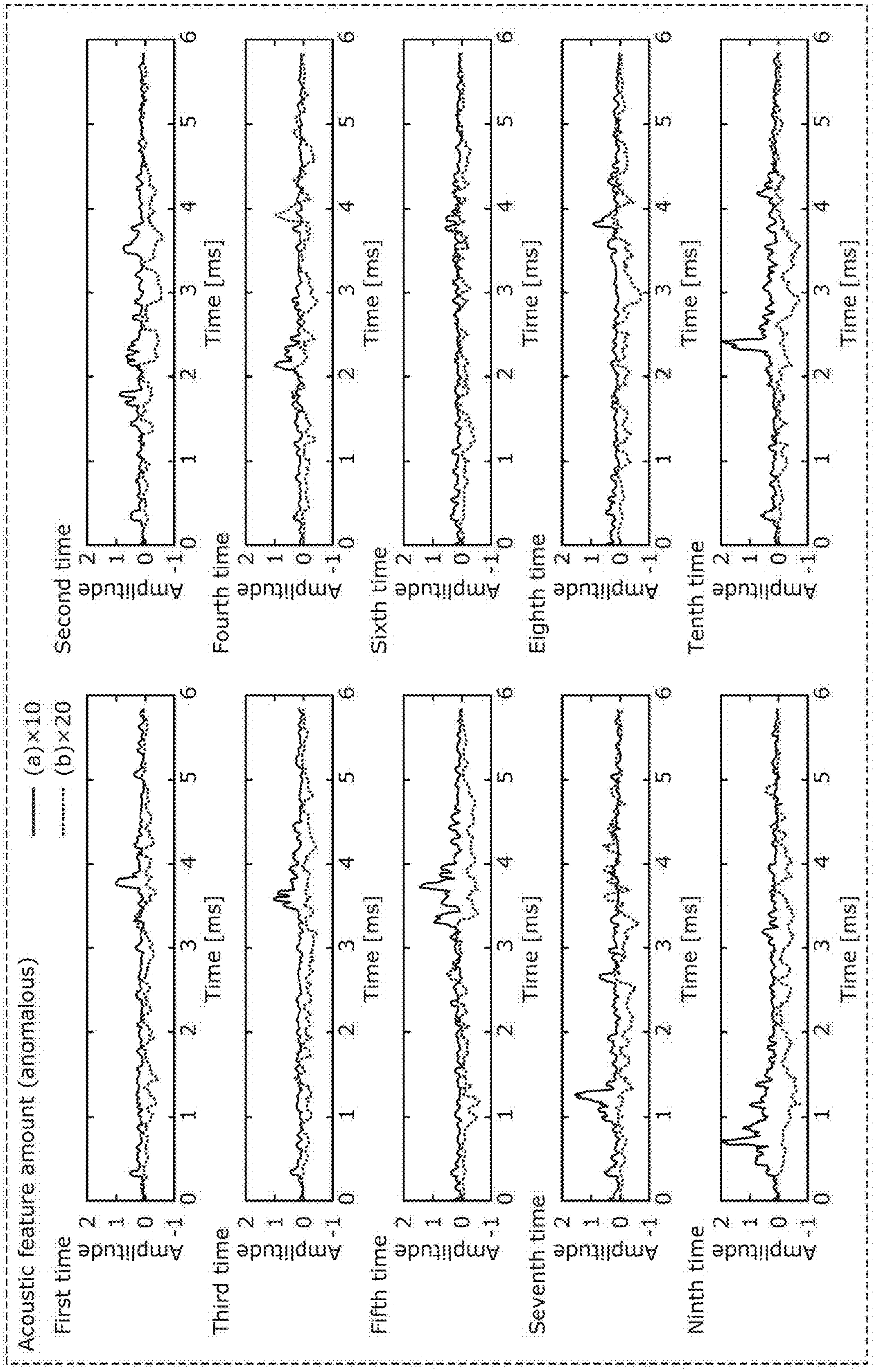
FIG. 16 is a diagram showing feature amounts (acoustic feature amounts) of the sounds collected when the welding was performed under conditions in which an anomaly easily occurred.

Whether it was possible to visually check timing at which an anomaly occurred by graphing the time variations of (A) and (B) described above was examined in Example 3 and Comparative Example 3. In FIGS. 15 and 16, a solid line indicates a value obtained by multiplying, by 10, the value of the root mean square (RMS) envelope of a waveform in 1 kHz or higher and 20 kHz or lower (a) corresponding to (A) described above, and a dashed line indicates a value obtained by multiplying, by 20, a difference between the RMS envelope of a waveform in 100 kHz or higher and 200 kHz or lower (b) corresponding to (B) described above and the RMS envelope average of the waveform in 100 kHz or higher and 200 kHz or lower during normal welding. The difference between the RMS envelope of the waveform in 100 kHz or higher and 200 kHz or lower (b) and the RMS envelope average of the waveform in 100 kHz or higher and 200 kHz or lower during the normal welding is calculated by the following formula.

$$E_n(t) = x_{envRMS}(n, t) - \frac{1}{10}\sum_{n=1}^{10} x_{envRMS}(n, t) \quad \text{[Formula 1]}$$

In the above formula, $X_{envRMs}$ represents the RMS envelope of a waveform.

Example 3

FIG. 15 is a diagram showing feature amounts (acoustic feature amounts) of the sounds collected when the welding was normally performed. As shown in FIG. 15, no areas were found where the value of the amplitude was increased or decreased in each of (a) and (b).

Comparative Example 3

FIG. 16 is a diagram showing feature amounts (acoustic feature amounts) of the sounds collected when the welding was performed under conditions in which an anomaly easily occurred. As shown in FIG. 16, in the graphs of (a), areas were found where the value (amplitude) of the envelope in 1 kHz or higher and 20 kHz or lower was increased. In the graphs of (b), areas were found where a difference between the sound in a frequency band of 100 kHz or higher and 200 kHz or lower and the RMS envelope average of the waveform in 100 kHz or higher and 200 kHz or lower during the normal welding was increased. Hence, it is considered that there is a tendency that when an anomaly occurs during welding, the sound pressure of the audible sound in 20 kHz or lower in the sounds generated at the welded part is increased and the sound pressure of the inaudible sound in 100 kHz or higher and 200 kHz or lower is decreased.

Discussion

It has been confirmed from the results of Examples 1 to 3 and Comparative Examples 1 to 3 that it is possible to detect an anomaly in a welded part based on a decrease in the sound pressure of an inaudible sound included in a sound generated at the welded part, in particular, an inaudible sound in a frequency band of 100 kHz or higher and 200 kHz or lower. It has also been confirmed that it is possible to detect an anomaly in the welded part based on an increase in the sound pressure of an audible sound included in the sound generated at the welded part, in particular, an audible sound in a frequency band of 1 kHz or higher and 20 kHz or lower. Hence, it has been confirmed that in the anomaly detection device and the anomaly detection method according to the present disclosure, it is possible to accurately detect an anomaly in the welded part based on a decrease in the sound pressure of an inaudible sound and an increase in the sound pressure of an audible sound included in a sound which is generated at the welded part and is collected.

OTHER EMBODIMENTS

Although the anomaly detection device and the anomaly detection method according to one or a plurality of aspects of the present disclosure have been described above based on the above embodiment, the present disclosure is not limited to the embodiment described above. Embodiments obtained by performing various variations conceived by those skilled in the art on the embodiment and embodiments formed by combining constituent elements in different embodiments may be included in the scope of one or a plurality of aspects of the present disclosure without departing from the spirit of the present disclosure.

For example, a part or all of constituent elements included in the anomaly detection device according to the embodiment described above may be formed with one system large scale integration (LSI) circuit. For example, the anomaly detection device may be formed with a system LSI circuit which includes a sound collector, a detector, and an outputter. The system LSI circuit does not need to include a sound collector.

The system LSI circuit is a super-multifunctional LSI circuit manufactured by integrating a plurality of constituent units on one chip, and is specifically a computer system which includes a microprocessor, a read only memory (ROM), a random access memory (RAM), and the like. In the ROM, computer programs are stored. The microprocessor is operated according to the computer programs to achieve the functions of the system LSI circuit.

Although the system LSI circuit is used here as the circuit, the circuit may be called an IC, an LSI circuit, a super LSI circuit, or an ultra LSI circuit depending on the degree of integration. A method for integration of the circuit is not limited to LSI, and the circuit may be realized by a dedicated circuit or a general-purpose processor. A field programmable gate array (FPGA) which can be programmed after the manufacturing of an LSI circuit or a reconfigurable processor in which connections and settings of circuit cells inside an LSI circuit can be reconfigured may be utilized.

Furthermore, if an integrated circuit technology which replaces LSI emerges due to advances in semiconductor technology or another derivative technology, the integration of functional blocks may naturally be performed using that technology. There is a possibility of the application of biotechnology or the like.

One aspect of the present disclosure may be not only the anomaly detection device as described above but also an anomaly detection method which uses, as a step, a characteristic constituent unit included in the device. One aspect of the present disclosure may also be a computer program which instructs a computer to execute characteristic steps included in the anomaly detection method. One aspect of the present disclosure may also be a non-transitory computer-readable recording medium having recorded thereon the computer program as described above.

(Additional Notes)

Hereinafter, techniques obtained from the disclosure of this specification will be illustrated, and effects and the like obtained from the techniques will be described.

[Technique 1]

An anomaly detection device includes: an acquirer that acquires a sound which is generated at a welded part during laser welding and is collected by a sound collector; and a detector that detects an anomaly in the welded part based on a change in an inaudible sound included in the sound acquired by the acquirer.

[Effect of Technique 1]

In this way, the anomaly detection device detects an anomaly in the welded part based on the inaudible sound included in the sound generated at the welded part during laser welding, and thus the anomaly detection device is unlikely to be affected by various audible sounds generated around the sound collector, that is, sounds resulting in noise. Since the band of the inaudible sound is unlikely to be affected by sounds resulting in noise, when the inaudible sound is changed (for example, when the sound pressure of the inaudible sound is changed), the anomaly detection device can detect the change. Hence, the anomaly detection device can enhance the accuracy of detection of an anomaly in the welded part.

[Technique 2]

In the anomaly detection device described in technique 1, the detector detects the anomaly in the welded part based on a decrease in a sound pressure of the inaudible sound included in the sound.

[Effect of Technique 2]

In this way, the anomaly detection device detects an anomaly in the welded part based on a decrease in the sound pressure of the inaudible sound included in the sound generated at the welded part during laser welding, and thus the anomaly detection device is unlikely to be affected by various audible sounds generated around the sound collector, that is, sounds resulting in noise. Since the band of the inaudible sound is unlikely to be affected by sounds resulting in noise, when the sound pressure of the inaudible sound is decreased, the anomaly detection device can detect the decrease in the sound pressure. Hence, the anomaly detection device can enhance the accuracy of detection of an anomaly in the welded part.

[Technique 3]

The anomaly detection device described in technique 1 or 2 further includes: a notifier that provides a notification to a user when the detector detects the anomaly.

[Effect of Technique 3]

In this way, the anomaly detection device can notify the occurrence of an anomaly in the welded part to the user, and thus the user can grasp whether an anomaly occurs in the welded part.

[Technique 4]

In the anomaly detection device described in any one of techniques 1 to 3, the sound collector is a laser microphone.

[Effect of Technique 4]

In this way, the anomaly detection device uses the laser microphone as the sound collector to be able to acquire a sound in a band broader than a case where the normal microphone is used, and thus a larger amount of information can be obtained. Hence, the anomaly detection device can detect an anomaly in the welded part based on a larger amount of information. Therefore, the anomaly detection device can extract a larger feature amount, and thus it is possible to enhance the accuracy of detection of an anomaly in the welded part. Although in the normal microphone (for example, a microphone including a diaphragm), it is difficult to collect a sound due to electromagnetic waves, a high temperature, the adhesion of metal pieces, or the like, the anomaly detection device uses the laser microphone to be able to collect a sound even in an environment where it is difficult to collect a sound with the normal microphone. Hence, the anomaly detection device can detect an anomaly in more environments.

[Technique 5]

In the anomaly detection device described in any one of techniques 1 to 4, the inaudible sound is a sound in a frequency band of 100 kHz or higher and 200 kHz or lower.

[Effect of Technique 5]

In this way, the anomaly detection device can extract, as the feature amount, a sound in a specific frequency band in the inaudible sound. Hence, the anomaly detection device can accurately detect an anomaly in the welded part based on the extracted feature amount.

[Technique 6]

In the anomaly detection device described in any one of techniques 1 to 5, the detector further detects the anomaly based on an increase in a sound pressure of an audible sound included in the sound.

[Effect of Technique 6]

In this way, the anomaly detection device can extract a larger feature amount based on the inaudible sound and the audible sound included in the sound. Hence, the anomaly detection device can enhance the accuracy of detection of an anomaly in the welded part.

[Technique 7]

In the anomaly detection device described in any one of techniques 1 to 6, the detector detects the anomaly based on a result of an output obtained by inputting sound information about the sound acquired by the acquirer to a trained machine learning model.

[Effect of Technique 7]

In this way, the anomaly detection device uses the machine learning model to be able to automatically extract the feature amount from the sound information, and thereby can more easily detect an anomaly in the welded part.

[Technique 8]

In the anomaly detection device described in technique 7, the sound information includes at least one of image data of a spectrogram of the sound, image data of a frequency characteristic of the sound, or time series data of the sound.

[Effect of Technique 8]

In this way, the anomaly detection device uses the sound information from which the feature amount of data is easily extracted to be able to facilitate the extraction of regularity of data (so-called feature amount) performed by the machine learning model.

[Technique 9]

In the anomaly detection device described in technique 8, the time series data is a time waveform of the sound.

[Effect of Technique 8]

In this way, the anomaly detection device uses the time waveform of the sound as the time series data of the sound to be able to facilitate the extraction of the feature amount about an increase and a decrease in the sound volume (that is, the sound pressure) performed by the machine learning model.

[Technique 10]

In the anomaly detection device described in any one of techniques 7 to 9, the result of the output indicates whether the anomaly occurs in the welded part or indicates a degree of the anomaly.

[Effect of Technique 10]

In this way, the anomaly detection device can detect an anomaly in the welded part based on whether an anomaly occurs in the welded part or the degree of anomaly.

[Technique 11]

In the anomaly detection device described in any one of techniques 1 to 10, the sound is a sound that is generated at the welded part when laser light is applied to the welded part, and includes a sound that is generated when an impurity adheres to the welded part.

[Effect of Technique 11]

In this way, the anomaly detection device can detect an anomaly in the welded part based on the sound.

[Technique 12]

In the anomaly detection device described in any one of techniques 1 to 11, the anomaly is at least one of production of spatter or production of a crack in the welded part.

[Effect of Technique 12]

In this way, the anomaly detection device can detect not only an anomaly in the front surface of the welded part but also an anomaly which occurs inside a welding target or in the back surface.

In this way, the anomaly detection device can detect an anomaly in the welded part based on the sound.

[Technique 13]

An anomaly detection device includes: a laser microphone that collects a sound which is generated at a welded part during laser welding; and a detector that detects an anomaly in the welded part based on the sound collected by the laser microphone.

[Effect of Technique 13]

In this way, the anomaly detection device can collect a sound using the laser microphone even in an environment where it is difficult to collect a sound with the normal microphone. For example, although in the normal microphone (for example, a microphone including a diaphragm), it is difficult to collect a sound due to electromagnetic waves, a high temperature, the adhesion of metal pieces, or the like, the laser microphone does not include a diaphragm unlike the normal microphone, and thus it is possible to collect a sound even in an environment of electromagnetic waves, a high temperature, high heat, metal pieces, or the like.

[Technique 14]

An anomaly detection method includes: acquiring a sound that is generated at a welded part during laser welding and is collected by a sound collector; and detecting an anomaly in the welded part based on a change in an inaudible sound included in the sound acquired in the acquiring.

[Effect of Technique 14]

In this way, a device which performs the anomaly detection method detects an anomaly in the welded part based on the inaudible sound included in the sound generated at the welded part during laser welding, and thus the device is unlikely to be affected by various audible sounds generated around the sound collector, that is, sounds resulting in noise. Since the band of the inaudible sound is unlikely to be affected by sounds resulting in noise, when the inaudible sound is changed (for example, when the sound pressure of the inaudible sound is changed), the device which performs the anomaly detection method can detect the change. Hence, the device which performs the anomaly detection method can enhance the accuracy of detection of an anomaly in the welded part.

[Technique 15]

In the anomaly detection method described in technique 14, in the detecting, the anomaly in the welded part is detected based on a decrease in a sound pressure of the inaudible sound included in the sound.

[Effect of Technique 15]

In this way, the device which performs the anomaly detection method detects an anomaly in the welded part based on a decrease in the sound pressure of the inaudible sound included in the sound generated at the welded part during laser welding, and thus the device is unlikely to be affected by various audible sounds generated around the sound collector, that is, sounds resulting in noise. Since the band of the inaudible sound is unlikely to be affected by sounds resulting in noise, when the sound pressure of the inaudible sound is decreased, the device which performs the anomaly detection method can detect the decrease in the sound pressure. It is assumed that when an anomaly occurs in the welded part, the sound pressure of the inaudible sound included in the sound generated at the welded part tends to be decreased. Hence, the device which performs the anomaly detection method can enhance the accuracy of detection of an anomaly in the welded part.

[Technique 16]

An anomaly detection method includes: collecting, by a laser microphone, a sound that is generated at a welded part during laser welding; and detecting an anomaly in the welded part based on the sound collected by the laser microphone.

[Effect of Technique 16]

In this way, the device which performs the anomaly detection method can collect a sound using the laser microphone even in an environment where it is difficult to collect a sound with the normal microphone. For example, although in the normal microphone (for example, a microphone including a diaphragm), it is difficult to collect a sound due to electromagnetic waves, a high temperature, the adhesion of metal pieces, or the like, the laser microphone does not include a diaphragm unlike the normal microphone, and thus it is possible to collect a sound even in an environment of electromagnetic waves, a high temperature, high heat, metal pieces, or the like.

[Technique 17]

A program for causing a computer to execute the anomaly detection method described in any one of techniques 14 to 16.

[Effect of Technique 17]

In this way, it is possible to use a computer to achieve the same effect as in any one of the anomaly detection methods described above.

INDUSTRIAL APPLICABILITY

According to the present disclosure, it is possible to accurately detect an anomaly in a welded part based on a sound generated at the welded part during laser welding. In the anomaly detection device and the anomaly detection method of the present disclosure, a laser microphone is used to collect a sound, and thus the anomaly detection device and the anomaly detection method can be used even in an environment where it is difficult to collect a sound with a normal microphone, with the result that it is possible to collect a sound in a band broader than the normal microphone. Hence, the anomaly detection device and the anomaly detection method of the present disclosure can be applied to an object in which it is difficult to visually determine an anomaly.

The invention claimed is:

1. An anomaly detection device comprising:

an acquirer that acquires a sound which is generated at a welded part during laser welding and is collected by a sound collector; and a detector that detects an anomaly in the welded part based on a decrease in a sound pressure of an inaudible sound included in the sound acquired by the acquirer and detects an anomaly in the welded part based on an increase in a sound pressure of an audible sound included in the sound acquired by the acquirer, wherein the inaudible sound is a sound which cannot be heard by a human, and the audible sound is a sound which can be heard by a human.

2. The anomaly detection device according to claim 1, further comprising:

a notifier that provides a notification to a user when the detector detects the anomaly.

3. The anomaly detection device according to claim 1, wherein the sound collector is a laser microphone.

4. The anomaly detection device according to claim 1, wherein the inaudible sound is a sound in a frequency band of 100 kHz or higher and 200 kHz or lower.

5. The anomaly detection device according to claim 1, wherein the detector detects the anomaly based on a result of an output obtained by inputting sound information about the sound acquired by the acquirer to a trained machine learning model.

6. The anomaly detection device according to claim 5, wherein the sound information includes at least one of image data of a spectrogram of the sound, image data of a frequency characteristic of the sound, or time series data of the sound.

7. The anomaly detection device according to claim 6, wherein the time series data is a time waveform of the sound.

8. The anomaly detection device according to claim 5, wherein the result of the output indicates whether the anomaly occurs in the welded part or indicates a degree of the anomaly.

9. The anomaly detection device according to claim 1, wherein the sound is a sound that is generated at the welded part when laser light is applied to the welded part, and includes a sound that is generated when an impurity adheres to the welded part, the impurity being a material different from a material of a welding target including the welded part.

10. The anomaly detection device according to claim 1, wherein the anomaly is at least one of production of spatter or production of a crack in the welded part.

11. An anomaly detection method comprising:

acquiring a sound that is generated at a welded part during laser welding and is collected by a sound collector; and detecting an anomaly in the welded part based on a decrease in an inaudible sound included in the sound acquired in the acquiring and detecting an anomaly in the welded part based on an increase in a sound pressure of an audible sound included in the sound acquired in the acquiring, wherein the inaudible sound is a sound which cannot be heard by a human, and the audible sound is a sound which can be heard by a human.

12. A non-transitory computer-readable recording medium having recorded thereon a program for causing a computer to execute the anomaly detection method according to claim 11.

* * * * *